US012684524B2

(12) United States Patent
Teyeb et al.

(10) Patent No.: US 12,684,524 B2
(45) Date of Patent: Jul. 14, 2026

(54) METHODS FOR POSITIONING DELEGATION

(71) Applicant: InterDigital Patent Holdings, Inc., Wilmington, DE (US)

(72) Inventors: Oumer Teyeb, Montreal (CA); Martino Freda, Laval (CA); Fumihiro Hasegawa, Westmount (CA); Jaya Rao, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 302 days.

(21) Appl. No.: 18/695,784

(22) PCT Filed: Oct. 18, 2022

(86) PCT No.: PCT/US2022/078306
§ 371 (c)(1),
(2) Date: Mar. 26, 2024

(87) PCT Pub. No.: WO2023/069951
PCT Pub. Date: Apr. 27, 2023

(65) Prior Publication Data
US 2024/0406915 A1 Dec. 5, 2024

Related U.S. Application Data

(60) Provisional application No. 63/407,363, filed on Sep. 16, 2022, provisional application No. 63/257,413, filed on Oct. 19, 2021.

(51) Int. Cl.
H04W 64/00 (2009.01)
H04B 17/318 (2015.01)
H04L 5/00 (2006.01)

(52) U.S. Cl.
CPC .......... H04W 64/00 (2013.01); H04B 17/318 (2015.01); H04L 5/0051 (2013.01)

(58) Field of Classification Search
None
See application file for complete search history.

(56) References Cited

U.S. PATENT DOCUMENTS 8,200,239 B2 6/2012 Mia et al.
2007/0293237 A1 12/2007 Correal et al.
(Continued)

FOREIGN PATENT DOCUMENTS

JP 2012508540 A 4/2012

OTHER PUBLICATIONS

3rd Generation Partnership Project, "3rd Generation Partnership Project; Technical Specification Group Radio Access Network; NR; Physical layer procedures for control (Release 15)", 3GPP TS 38.213 v15.3.0, Sep. 2018, 101 pages.
(Continued)

*Primary Examiner* — Frantz Bataille
(74) *Attorney, Agent, or Firm* — Flaster Greenberg P.C.

(57) ABSTRACT

A wireless transmit-receive unit (WTRU) may be configured to perform one or more actions. The WTRU may receive positioning configuration information. The positioning configuration information may include an indication of one or more positioning delegation candidates for the WTRU and an indication of one or more conditions for starting or stopping positioning delegation. The WTRU may detect that a condition for starting positioning delegation has been satisfied for at least one of the positioning delegation candidates. The WTRU may send an indication to a network device that the WTRU is using at least one positioning delegation candidate which has satisfied conditions. The WTRU may detect that a condition for stopping positioning
(Continued)

delegation has been satisfied for at least one positioning delegation candidate. The WTRU may send an indication to the network device that the WTRU has stopped using at least one positioning delegation candidate for positioning.

20 Claims, 8 Drawing Sheets

(56) References Cited

U.S. PATENT DOCUMENTS

| | | | |
|---|---|---|---|
| 2015/0271154 A1 | 9/2015 | Ronca | |
| 2017/0310682 A1 | 10/2017 | Kockan et al. | |
| 2020/0205079 A1* | 6/2020 | Tong | H04W 52/0248 |
| 2022/0246013 A1* | 8/2022 | Worecki | G08B 21/0225 |

OTHER PUBLICATIONS

3<sup>rd</sup> Generation Partnership Project, "3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 v16.4.0, Mar. 2021, 119 pages.

3<sup>rd</sup> Generation Partnership Project, "3rd Generation Partnership Project; Technical Specification Group Radio Access Network; NR; Medium Access Control (MAC) protocol specification (Release 15)", 3GPP TS 38.321 v15.1.0, Mar. 2018, 67 pages.

3<sup>rd</sup> Generation Partnership Project, "3rd Generation Partnership Project; Technical Specification Group Radio Access Network; NR; Radio Resource Control (RRC) protocol specification (Release 15)", 3GPP TS 38.331 v15.4.0, Dec. 2018, 474 pages.

* cited by examiner

METHODS FOR POSITIONING DELEGATION

CROSS-REFERENCE TO RELATED APPLICATION

This patent application is the 371 National Stage of International Application No. PCT/US2022/078306, filed Oct. 18, 2022, which claims the benefit of U.S. Provisional Patent Application No. 63/257,413, filed on Oct. 19, 2021, and U.S. Provisional Patent Application No. 63/407,363, filed On Sep. 16, 2022, the entireties of which are herein incorporated by reference.

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth-generation (4G) long-term evolution (LTE). Wireless communication devices may establish communications with other devices and data networks, e.g., via an access network, such as a radio access network (RAN).

SUMMARY

Systems, methods, and instrumentalities are disclosed herein for position delegation. A wireless transmit-receive unit (WTRU) may be configured with information about position delegate from which it may get information about its own location. The WTRU may be configured with conditions when to start using a position delegate and when to stop using a position delegate. The WTRU may start using a position delegate for getting its location in response to determining the availability of a position delegate and the conditions for starting using a position delegate are fulfilled. The WTRU may stop using a position delegate for getting its location in response to determining a position delegate is no more available or the conditions for using a position delegate are no more fulfilled. The WTRU may stop or minimize positioning related operations while using the services of a position delegate. The WTRU may resume normal positioning related operations when it has stopped using the services of a position delegate. The WTRU may inform the network when starting and stopping using the services of a position delegate.

A WTRU may be configured to apply a selection mechanism when there are a plurality of position delegation candidates. The selection mechanism may be based on any combination of the WTRU positioning requirements, the positioning capabilities of the delegates, the current WTRU conditions, and/or signal level between the WTRU and the delegates. In some examples, the WTRU may be configured to apply one or more offsets on measurements related to position delegate cells.

The WTRU may receive positioning configuration information. The positioning configuration information may include an indication of one or more positioning delegation candidates for the WTRU and/or an indication of one or more conditions for enabling (e.g. starting) and/or disabling (e.g., stopping) positioning delegation.

The WTRU may detect that a condition for enabling (e.g. starting) positioning delegation has been satisfied for at least one of the positioning delegation candidate(s). The WTRU may send an indication (e.g., a starting indication) to a network (e.g., an integrated access and backhaul node (IAB node) that the WTRU is using the at least one positioning delegation candidate for positioning. The WTRU may send the indication based on detecting that the condition for enabling positioning delegation has been satisfied for the positioning delegation candidate(s). The WTRU may detect that a condition for disabling positioning delegation has been satisfied for the positioning delegation candidate(s).

The WTRU may send an indication (e.g., a stopping indication) to the network that the WTRU has stopped using the positioning delegation candidate(s) for positioning. The WTRU may stop using the positioning delegate based on detecting that the condition for disabling positioning delegation has been satisfied for the positioning delegation candidate(s).

The WTRU may be configured to send a message to the network requesting to perform positioning delegation.

The condition for enabling the positioning delegation may include a WTRU battery level falling below a threshold, connecting to the positioning delegation candidate(s), and/or detecting that the WTRU is within a specified proximity to the positioning delegation candidate(s).

The condition for enabling the positioning delegation may include detecting that the WTRU is within the specified proximity to the positioning delegation candidate(s) based on a signal strength measurement received from the positioning delegation candidate(s).

The WTRU may be configured to perform measurements of one or more positioning reference signal (PRS) transmissions and/or reporting PRS measurements. The configuration may be based on detecting that the condition for disabling positioning delegation has been satisfied for the positioning delegation candidate(s).

The indication sent by the WTRU that the WTRU is using a positioning delegation candidate(s) for positioning may include location information for the positioning delegation candidate.

The WTRU may be configured to receive a positioning request from a network. The indication sent by the WTRU that the WTRU is using the at least one positioning delegation candidate for positioning may be sent to the network in response to the positioning request.

The WTRU may be configured to send a location disparity report to the network, wherein location disparity report indicates a difference between the location of the WTRU and a location of the positioning delegate.

The WTRU may be configured to send the location disparity report to the network based on the difference exceeding a disparity threshold for a predetermined period of time.

The WTRU may be configured to perform positioning measurements for a specified duration after connecting to the positioning delegate. The WTRU may compare the location information that it has determined with the location information provided by the positioning delegate.

The method performed by the WTRU may include receiving positioning configuration information. The positioning configuration information including an indication of one or more positioning delegation candidates for the WTRU and an indication of one or more conditions for enabling or disabling positioning delegation.

The method may include detecting that a condition for enabling positioning delegation has been satisfied for at least one of the positioning delegation candidates. The method may include sending an indication to a network that the WTRU is using the at least one positioning delegation candidate for positioning. The method may base the selection on detecting that the condition for enabling positioning delegation has been satisfied for the at least one positioning delegation candidate. The method may include detecting that a condition for disabling positioning delegation has been satisfied for the at least one positioning delegation candidate. The method may include sending an indication to the network that the WTRU has stopped using the at least one positioning delegation candidate for positioning based on detecting that the condition for disabling positioning delegation has been satisfied for the at least one positioning delegation candidate.

The method may include sending a message to the network requesting to perform positioning delegation.

The condition for enabling the positioning delegation may include one or more of a WTRU battery level falling below a threshold, connecting to the at least one positioning delegation candidate, and/or detecting that the WTRU is within a specified proximity to the at least one positioning delegation candidate.

The condition for enabling the positioning delegation may include detecting that the WTRU is within the specified proximity to the at least one positioning delegation candidate based on a signal strength measurement received from the at least one positioning delegation candidate.

The method may include performing measurements of one or more PRS transmissions and/or reporting PRS measurements based on detecting that the condition for disabling positioning delegation has been satisfied for the at least one positioning delegation candidate.

The indication sent by the WTRU that the WTRU is using the at least one positioning delegation candidate for positioning comprises location information that indicates the position of the at least one positioning delegation candidate.

The WTRU may be configured to receive a positioning request from a network. The indication sent by the WTRU that the WTRU is using the at least one positioning delegation candidate for positioning may be sent to the network in response to the positioning request The method may include receiving a positioning request from a network. The indication sent by the WTRU that the WTRU is using the at least one positioning delegation candidate for positioning may be sent to the network in response to the positioning request.

The method may include sending a location disparity report to the network based on the difference exceeding a disparity threshold for a predetermined period of time.

The WTRU may be configured to receive positioning configuration information. The WTRU may select a positioning delegation candidate for positioning based on the positioning configuration information. The WTRU may send an indication to a network that the WTRU is using the positioning delegation candidate for positioning. The WTRU may send an indication to the network that the WTRU has stopped using the positioning delegation candidate for positioning.

The WTRU may include positioning configuration information that includes an indication for the WTRU and/or an indication of condition(s) for enabling or disabling positioning delegation. The positioning delegation candidate(s) indicated by the positioning configuration information may include the selected positioning delegation candidate. The WTRU may be configured to detect that a condition for enabling positioning delegation has been satisfied for the selected positioning delegation candidates. The WTRU may send the indication to the network that the WTRU is using the selected positioning delegation candidate for positioning. The WTRU may base the selection on detecting that the condition for enabling positioning delegation has been satisfied for the selected positioning delegation candidate. The WTRU may detect that a condition for disabling positioning delegation has been satisfied for the selected positioning delegation candidate. The WTRU may send the indication to the network that the WTRU has stopped using the selected positioning delegation candidate for positioning based on detecting that the condition for disabling positioning delegation has been satisfied for the selected positioning delegation candidate.

The WTRU may be configured to receive positioning configuration information. The positioning configuration information may include an indication of one or more positioning delegation candidates for the WTRU and an indication of one or more conditions for enabling or disabling positioning delegation. The WTRU may detect that a condition for enabling positioning delegation has been satisfied for at least one of the positioning delegation candidates. The WTRU may send an indication to a network that the WTRU is using the at least one positioning delegation candidate for positioning based on a detection that the condition for enabling to use a positioning delegation has been satisfied for the at least one positioning delegation candidate.

The positioning configuration information that may include an indication of one or more conditions for enabling or disabling positioning delegation. The WTRU may detect that a condition for disabling positioning delegation has been satisfied for the at least one positioning delegation candidate. The WTRU may send a disabling indication to the network that the WTRU has stopped using the at least one positioning delegation candidate for positioning based on detecting that the condition for disabling the positioning delegation has been satisfied for the at least one positioning delegation candidate.

The WTRU may send a message to the network requesting to perform positioning delegation.

The condition for enabling the positioning delegation may include one or more of a WTRU battery level falling below a threshold, connecting to the at least one positioning delegation candidate, and/or detecting that the WTRU is within a specified proximity to the at least one positioning delegation candidate.

The condition for enabling the positioning delegation may include detecting that the WTRU is within the specified proximity to the at least one positioning delegation candidate based on a signal strength measurement received from the at least one positioning delegation candidate.

The WTRU may perform measurements of one or more PRS transmissions and/or reporting PRS measurements. The configuration may be based on detecting that the condition for disabling positioning delegation has been satisfied for the at least one positioning delegation candidate.

The enabling indication may include location information that indicates the position of the at least one positioning delegation candidate. The WTRU may be configured to receive a positioning request from a network. The enabling indication may be sent to the network in response to the positioning request.

The WTRU may send a location disparity report to the network. The location disparity report may indicate a difference between the location of the WTRU and a location of the positioning delegate.

The WTRU may send the location disparity report to the network based on the difference exceeding a disparity threshold for a predetermined period of time.

The WTRU may perform positioning measurements for a specified duration after connecting to the positioning delegate. The WTRU may compare the location information that it has determined with the location information provided by the positioning delegate.

The method performed by the WTRU may include receiving positioning configuration information. The positioning configuration information may include an indication of one or more positioning delegation candidates for the WTRU. The positioning configuration may include an indication of one or more conditions for enabling or disabling positioning delegation.

The method may include detecting that a condition for enabling positioning delegation has been satisfied for at least one of the positioning delegation candidates. The method may include sending an indication to a network that the WTRU is using the at least one positioning delegation candidate for positioning based on detecting that the condition for enabling positioning delegation has been satisfied for the at least one positioning delegation candidate.

The method may include an indication of one or more conditions for enabling or disabling positioning delegation. The method may include detecting that a condition for disabling positioning delegation has been satisfied for the at least one positioning delegation candidate. The method may include sending an indication to the network that the WTRU has stopped using the at least one positioning delegation candidate for positioning based on detecting that the condition for disabling positioning delegation has been satisfied for the at least one positioning delegation candidate.

The method may include sending a message to the network requesting to perform positioning delegation.

The condition for enabling the positioning delegation comprises one or more of a WTRU battery level falling below a threshold, connecting to the at least one positioning delegation candidate, and/or detecting that the WTRU is within a specified proximity to the at least one positioning delegation candidate.

The condition for enabling the positioning delegation comprises detecting that the WTRU is within the specified proximity to the at least one positioning delegation candidate based on a signal strength measurement received from the at least one positioning delegation candidate.

The method may include performing measurements of one or more PRS transmissions and reporting PRS measurements based on detecting that the condition for disabling positioning delegation has been satisfied for the at least one positioning delegation candidate.

The indication may include location information that indicates the position of the at least one positioning delegation candidate.

The method may include receiving a positioning request from a network, wherein the indication is sent to the network in response to the positioning request.

The method may include sending a location disparity report to the network based on the difference exceeding a disparity threshold for a predetermined period of time.

A WTRU may receive positioning configuration information. The WTRU may select a positioning delegation candidate for positioning based on the positioning configuration information. The WTRU may send an enabling indication to a network that the WTRU is using the positioning delegation candidate for positioning. The WTRU may send a disabling indication to the network that the WTRU has stopped using the positioning delegation candidate for positioning.

The positioning configuration information may include an indication of one or more positioning delegation candidates for the WTRU. The positioning information may include an indication of one or more conditions for enabling or disabling positioning delegation. The one or more positioning delegation candidates indicated by the positioning configuration information may include the selected positioning delegation candidate.

The WTRU may detect that a condition for enabling positioning delegation has been satisfied for the selected positioning delegation candidates. The WTRU may send the enabling indication to the network that the WTRU is using the selected positioning delegation candidate for positioning based on a detection that the condition for enabling positioning delegation has been satisfied for the selected positioning delegation candidate. The WTRU may detect that a condition for disabling positioning delegation has been satisfied for the selected positioning delegation candidate. The WTRU may send the disabling indication to the network that the WTRU has stopped using the selected positioning delegation candidate for positioning based on detecting that the condition for disabling positioning delegation has been satisfied for the selected positioning delegation candidate.

DETAILED DESCRIPTION

Figure 1A:
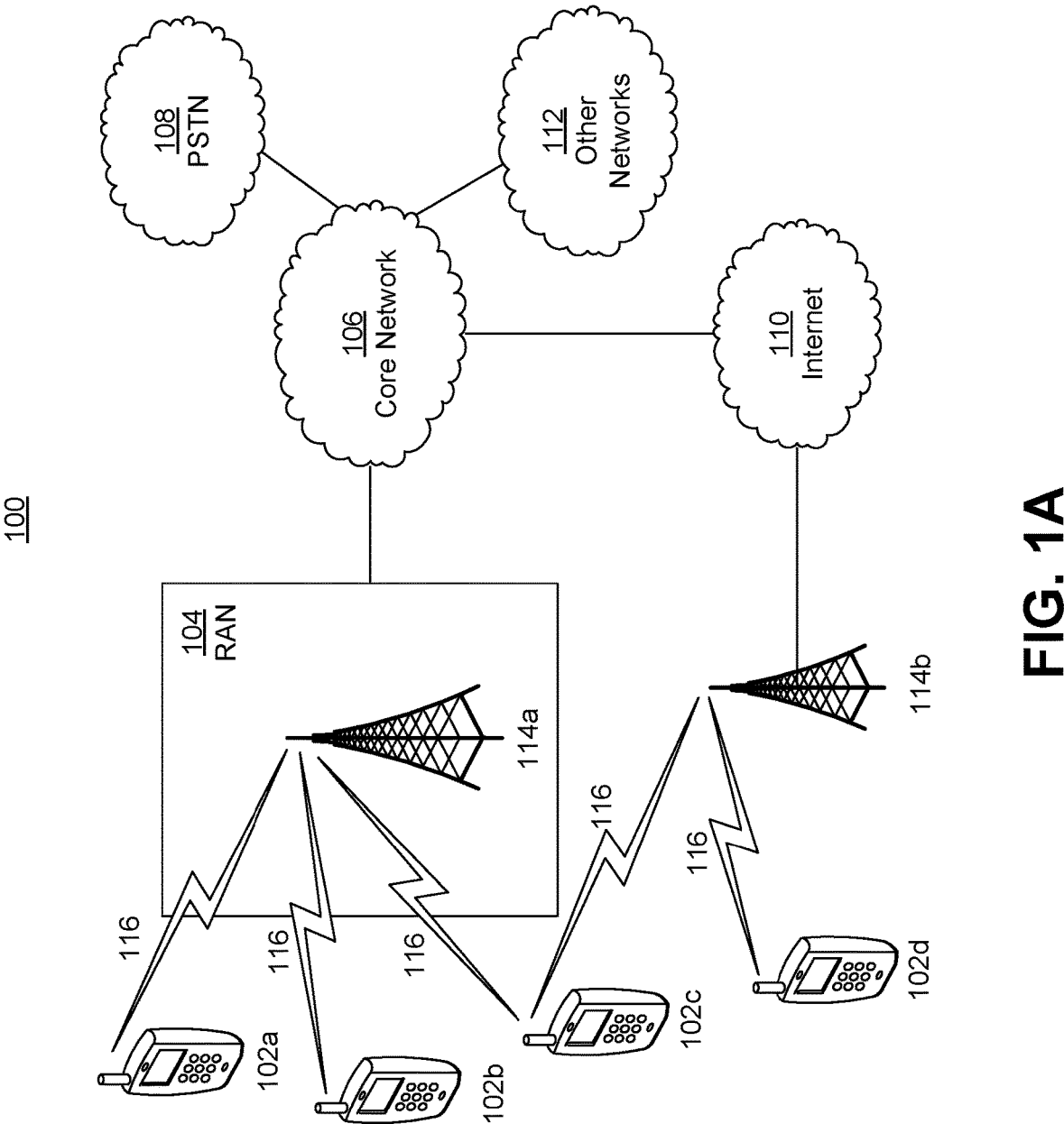
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an encode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN).

In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
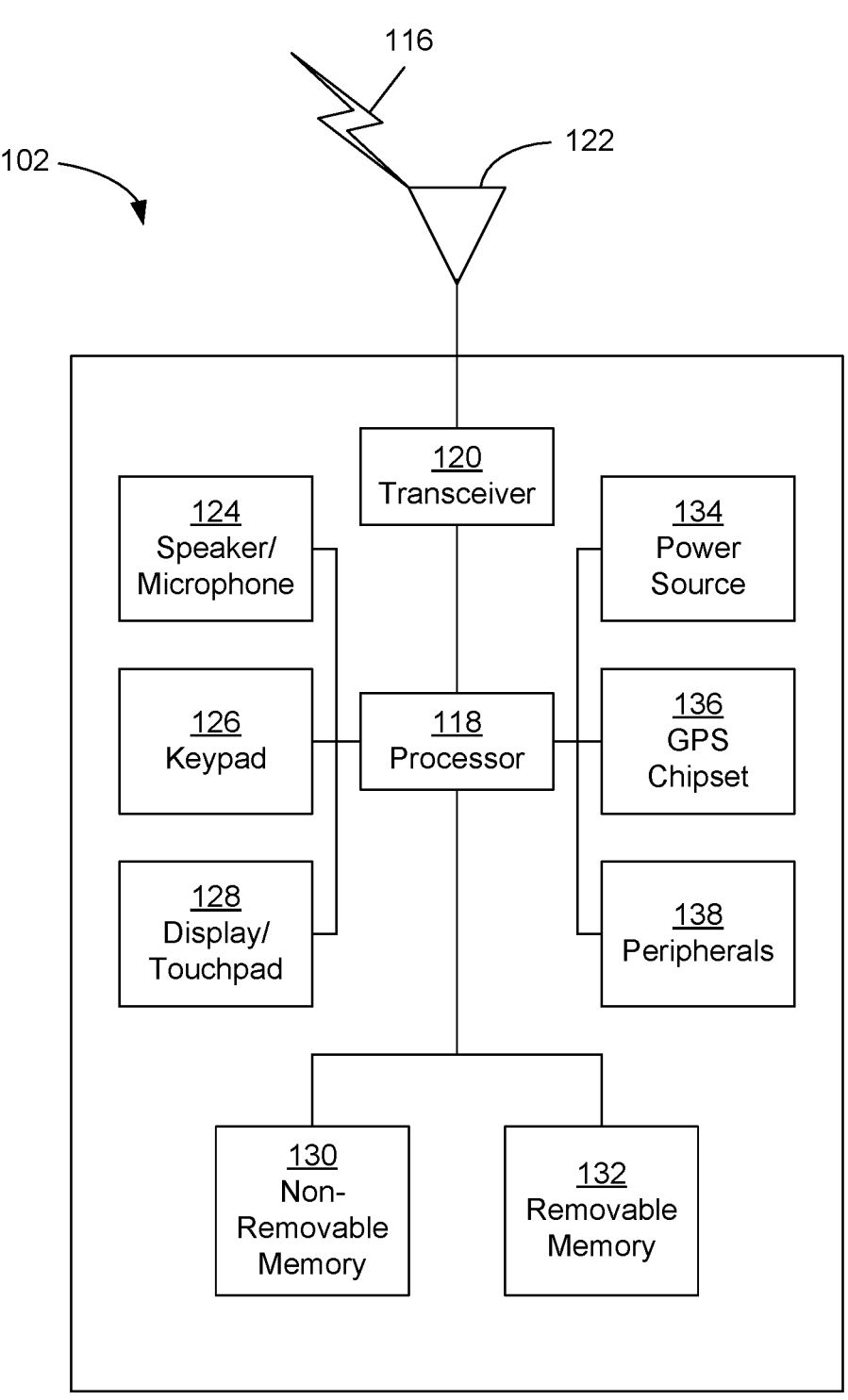
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
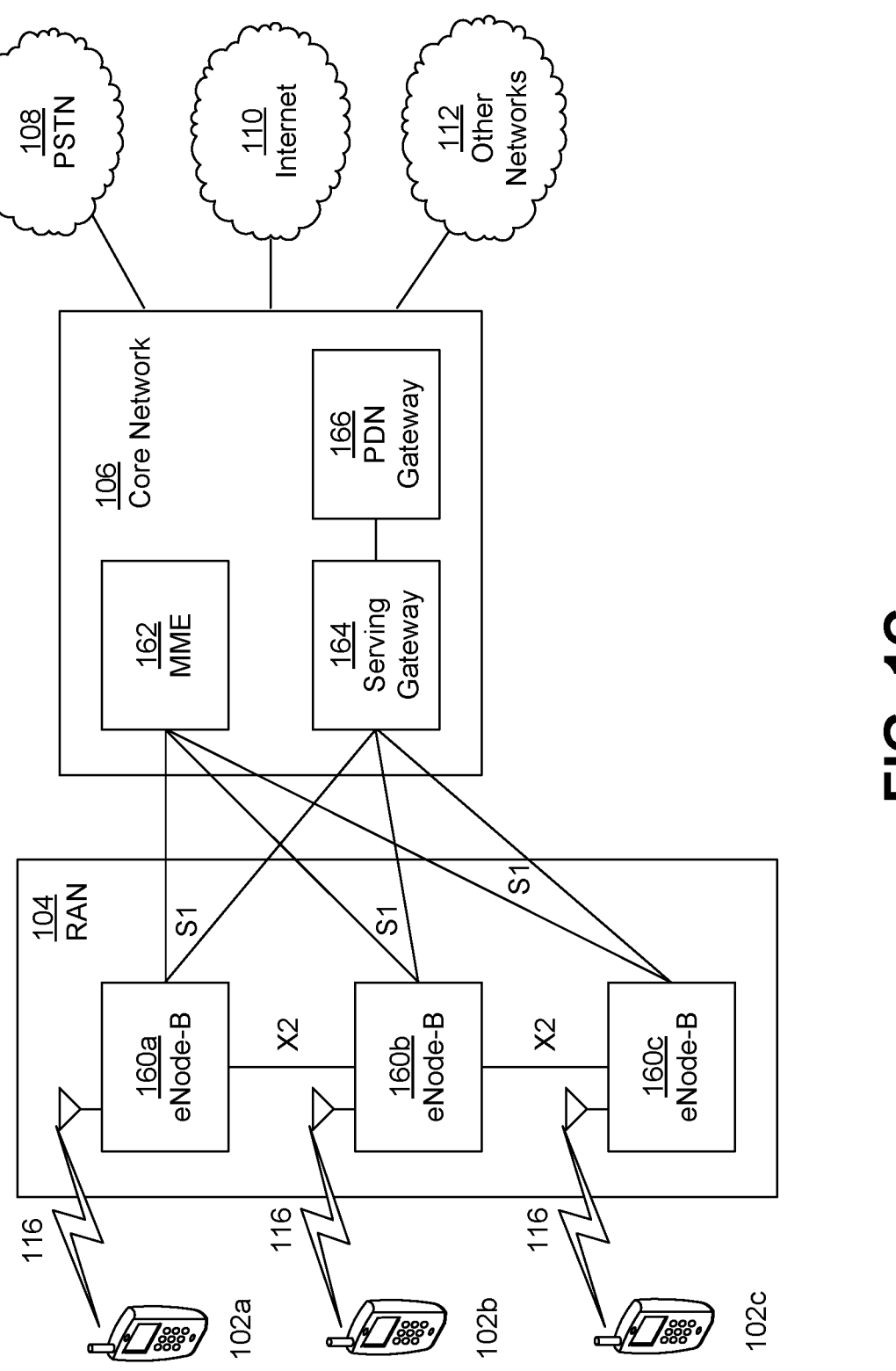
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
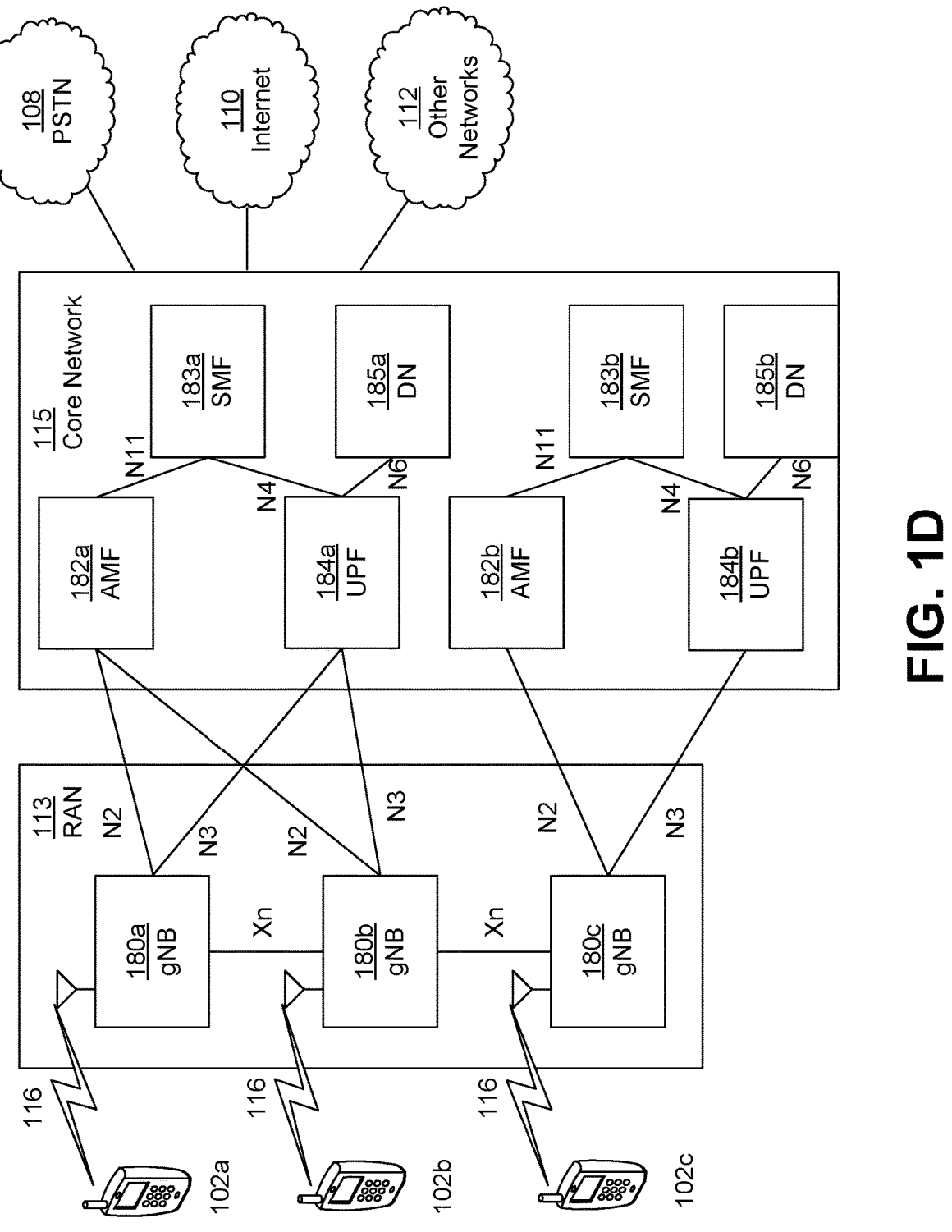
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

References herein to a gNB refer to an example base station and the gNB may be substituted with any other suitable base station.

A WTRU may perform one or more operations related to positioning.

The WTRU may receive configuration information from a network to determine a position delegate node and/or cell. The WTRU may get its location information from the configuration information (e.g., without necessarily performing measurement related operations). For example, the position node and/or cell may included in a list of delegate serving nodes/cells, and/or a list of neighbor cells that may act as a delegate.

The WTRU may receive an indication from a serving node and/or cell or a neighbor cell (e.g., via broadcast signaling, and/or dedicated RRC/MAC message(s)). The indication may indicate that the serving node and/or cell or the neighbor cell may be capable of acting as a position delegate.

The WTRU may receive configuration information from the network, wherein the configuration information may include condition(s) under which to use a position delegate. Conditions may include a signal level toward the position delegate being above a level (e.g., a certain level), the current WTRU battery level is below a level (e.g., a certain level), and/or the WTRU's own location accuracy has fallen below a level (e.g., a certain accuracy level).

In determining the availability of a position delegate, such as when a node and/or cell capable of position delegation becomes a serving cell of the WTRU, the WTRU may be able to measure a neighbor cell able to perform position delegation (e.g., with good radio quality, etc.). When one or more of the conditions for using a position delegate are fulfilled, the WTRU may perform one or more operations. For example, the WTRU may obtain the position information from the delegate, including reading a broadcasted location information, and/or explicitly requesting from the concerned node and/or cell the location information. The WTRU may stop or suspend location related operation(s) (e.g., measurement(s), sending of UL signal(s)/report(s), etc.) The WTRU may send information to the network. The information sent by the WTRU may indicate the position delegation has started.

In determining the unavailability of a position delegate, such as when the WTRU disconnects from a node and/or cell acting as a position delegate, the WTRU may not be able to measure a neighbor acting as a position delegate (e.g., with good radio quality, etc.). When one or more of the conditions for using a position delegate are (e.g., no more) fulfilled, the WTRU may perform one or more of operations. For example, the WTRU may start or resume location related operation(s) (e.g., measurement(s), sending of UL signal(s)/report(s), etc.) The WTRU may send information to the network. The information may indicate that the position delegation has stopped.

Figure 2:
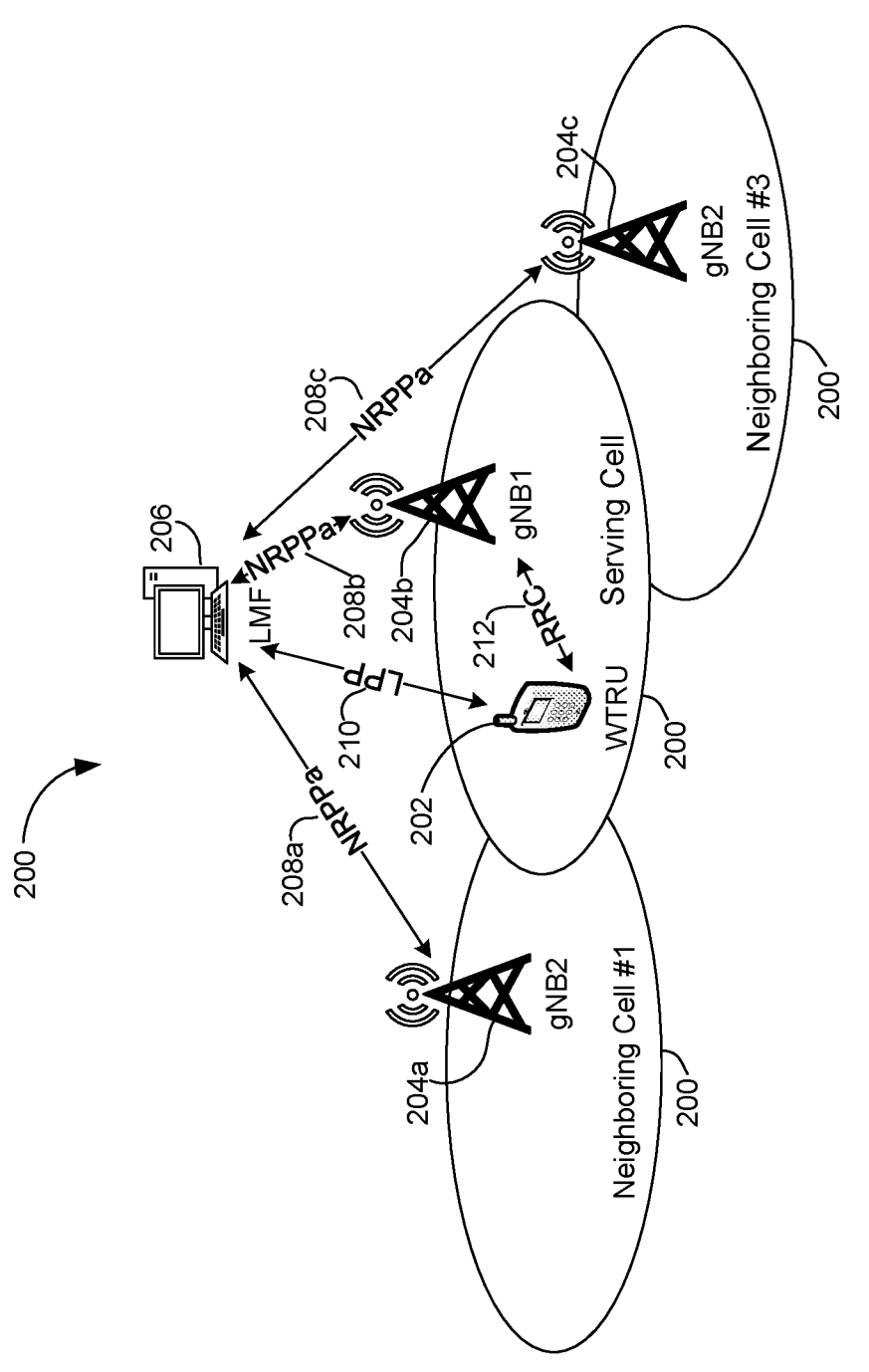
FIG. 2 illustrates an example of protocols used in new radio (NR) positioning.

Positioning operation(s) may be implemented. Protocol(s) for positioning operations(s) may be implemented. FIG. 2 illustrates an example protocol 200 used in a positioning operation configured between a WTRU 202 and a network node (e.g. a gNB 204a).

A protocol used for positioning may be between gNBs 204a and 204c and a location management function (LMF) 206, such as new radio (NR) Positioning Protocol A (NRPPa) 208a and 208c. A protocol used for positioning may be between a WTRU 202 and an LMF 206, such as LTE positioning protocol (LPP) 210.

LMF functionality may be implemented. A LMF 206 may determine a positioning method to be supported by a WTRU 202 (e.g., WTRU-assisted/WTRU-based, downlink (DL)-based/uplink (UL)-based) based on positioning capability information sent by the WTRU 202. The LMF 206 may provide one or more positioning reference signal (PRS) configuration(s) to the WTRU (e.g., for DL-based positioning) and/or one or more sounding reference signal (SRS) configuration(s) to gNBs/transmission reception points (TRPs) (e.g., for UL-based positioning). For WTRU-assisted positioning, the LMF 206 may perform calculation of the WTRU 202 location information based on measurement report sent by the WTRU 202. For WTRU-based positioning, the LMF 206 may forward the WTRU 202 location information (e.g., which may be sent by the WTRU) to an external application/location service client. The LMF 206 may rely on information sent by the WTRU 202.

The contents of the NRPPa 208a and 208b protocol may include SRS or PRS configurations so that the gNBs/TRPs know what to transmit and/or receive.

The contents of the LPP 210 protocol (e.g., from the LMF 206) may include location request(s) for a WTRU 202 (e.g., so the WTRU 202 to start the positioning process such as performing measurement(s)). PRS configurations may be associated with gNBs/TRPs in serving and neighboring cells for the WTRU 202 (e.g., so the WTRU knows what to receive), and/or measurements details (e.g., so the WTRU knows how/what to measure).

The contents of the protocol LPP 210 (e.g., from the WTRU 202) may include positioning capability information, assistance data request in the case that the WTRU 202 does not have any PRS configurations, measurement reports for WTRU-assisted positioning, and/or location information for WTRU-based positioning. LPP 210 messages may be carried in non-access stratum protocol data units (NAS PDUs).

Using the protocol RRC 212, e.g., for DL-based positioning, the WTRU 202 may be able to access one or more PRS configuration(s) via a parameter (e.g., a posSIB). The WTRU may be able to request a gNB to configure measurement gap, e.g., in preparation to start performing measurements of DL-PRS.

Using the protocol RRC 212, e.g., for UL-based positioning, the WTRU 202 may receive one or more SRS configuration(s) from a serving gNB.

A DL positioning method described herein may refer to the positioning method(s) that use downlink reference signals, such as the positioning PRS. The WTRU 202 may receive multiple reference signals from TP(s) and may measure DL reference signal time delay (RSTD) and/or reference signal received power (RSRP). Examples of DL positioning methods include, e.g., downlink angle of departure (DL-AoD) and/or downlink time difference of arrival (DL-TDOA) positioning.

A UL positioning method described herein may refer to the positioning method(s) that use uplink reference signals, such as positioning SRS. The WTRU 202 may transmit SRS to multiple reception points (RPs) and the RPs may measure the uplink relative time of arrival (UL RTOA) and/or RSRP. Examples of UL positioning methods include, e.g., uplink time difference of arrival (UL-TDOA) and/or uplink angle of arrival (UL-AoA) positioning.

A DL and UL positioning method described herein may refer to the positioning method(s) that use uplink and downlink reference signals for positioning. For example, a WTRU may transmit SRS to multiple TRPs and a gNB may measure the time difference between receiving and transmitting (Rx-Tx) the SRS. For example, the gNB may measure RSRP for the received SRS. The WTRU may measure the Rx-Tx time difference for PRS transmitted from multiple TRPs. For example, the WTRU may measure the RSRP for the received PRS. For example, the Rx-TX difference and possibly the RSRP measured at the TRU and the gNB may be used to compute a round trip time. Herein Rx and Tx difference refers to the difference between arrival time of the reference signal transmitted by the TRP and transmission time of the reference signal transmitted from the WTRU. An example of DL and UL positioning method may be multi-round trip time (RTT) positioning.

Integrated access and backhaul (IAB), where part of the wireless spectrum may be used for the backhaul connection of base stations instead of fiber, may allow a more flexible and cheaper deployment of dense networks (e.g., as compared to deployments where there is a dedicated fiber link to the base stations). An IAB solution may be based on a split architecture (e.g., centralized unit (CU) and/or distributed unit (DU) architecture), which may be specified for NR.

Figures 3A, 3B:
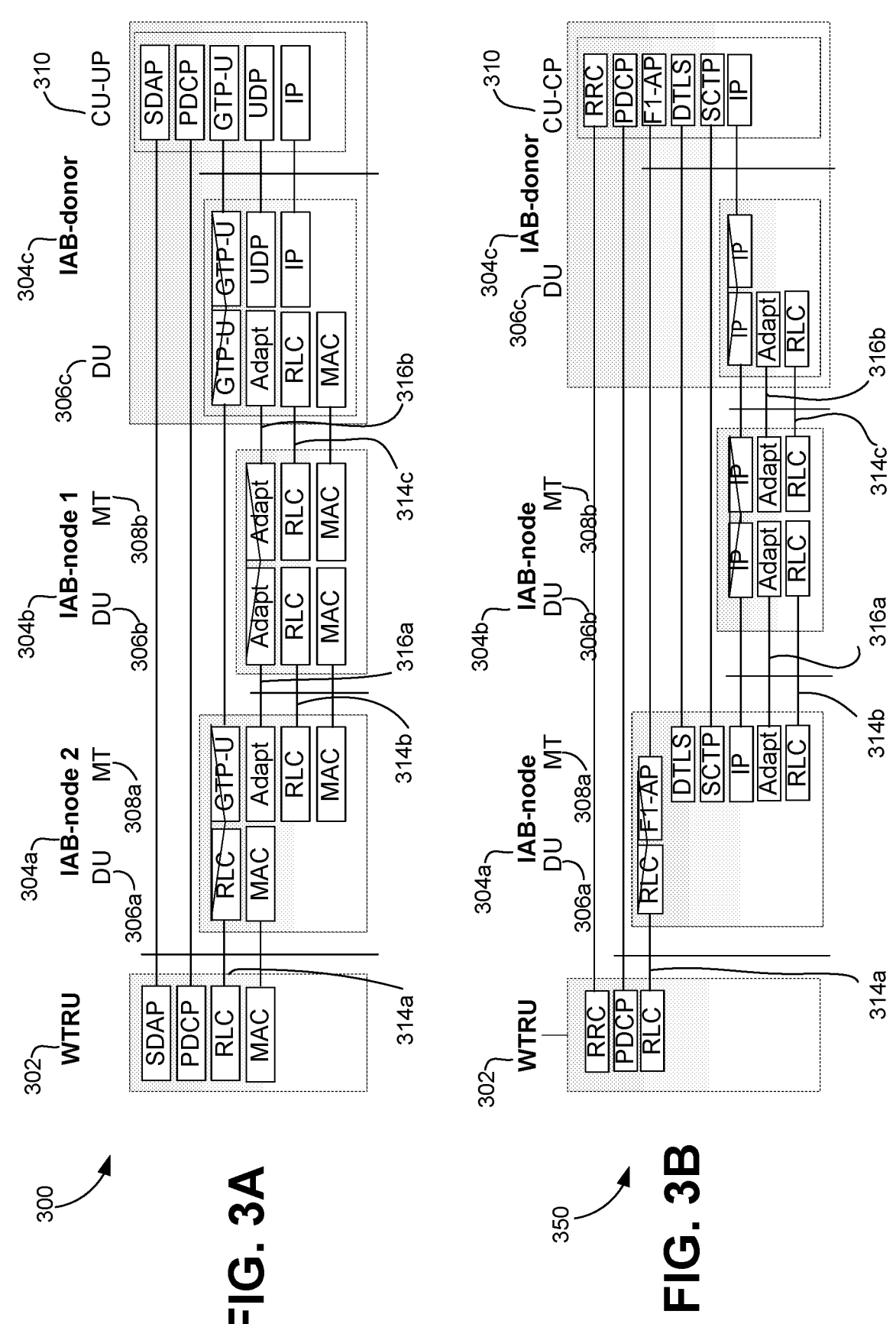
FIG. 3A illustrates an example integrated access and backhaul (IAB) architecture user plane.
FIG. 3B illustrates an example integrated access and backhaul (IAB) architecture control plane.

FIGS. 3A-B illustrate examples of integrated access and backhaul (IAB) architecture. The example architecture may include the user plane (UP) 300 and control plane (CP) protocol architecture 350 for IAB.

The IAB node 304a's protocol stack may contain two sides, the mobile termination (MT) 308a-b part, which may be used to communicate with a parent node, and a DU 306a-b part, which may be used to communicate with a child node or a WTRU 302 (e.g., a normal WTRU). Each IAB node 304a-b may be assigned an IP address. The IP address may be routable from a donor base station (and associated L2 addresses). The intermediate IAB nodes 304a-b may forward the packets (e.g., transparently), based on route identifiers and/or destination addresses. The IAB nodes 304a-b may terminate the DU 306c functionality. The base station, referred to as an IAB-donor 304c, may terminate the CU 310 functionality. The IAB node (304a, 204b) and the donor CU 310, regardless of the number of hops physically separating them, may form one logical base station unit. For example, the IAB node 304a-b may employ a CU/DU split architecture where the IAB node 304a-b may be considered as the DU 306c, and the CU part of the IAB donor 304a-b, CU 310, is considered as the CU. The IAB node 304a serving a WTRU 302 may be referred to as the access IAB node. The nodes between the IAB donor 304c DU 306c and the access IAB node 304a may be known as intermediate IAB nodes 304b. An IAB node 304a-b may play the role of an access IAB node 304a (e.g., for the WTRUs 302 that are directly connected to the access IAB node 304a) and an intermediate IAB node 304b (e.g., for WTRUs 302 that are served by its descendant IAB nodes).

The hop-by-hop (H2H) RLC 314a-c may be used between the IAB nodes 304a-c (e.g., instead of an end-to-end (E2E) RLC between the donor DU 306c and the WTRU 302). An adaption layer 316a-b, which may be referred to as backhaul adaptation protocol (BAP), may be used to enable efficient multi-hop forwarding. The IAB donor 304c may assign a unique L2 address (BAP address) to each IAB node 304a-b that the IAB donor 304c controls. In examples, multiple route IDs may be associated to each BAP address. The BAP of the origin node (e.g., the IAB donor 304c DU 306c for the DL traffic, and the access IAB node 306a for the UL) may add a BAP header to packets they are transmitting, which may include a BAP routing ID (e.g., BAP address of the destination/source IAB node 304a-c and the path ID).

If a packet arrives with a BAP routing ID that contains a BAP address equal to the IAB node 304a-b's BAP address, the IAB node 304a-b may know the packet intends to be received by the IAB node 304a-b. The IAB node 304a-b may pass the packet on to higher layers for processing (e.g., an F1-C/U message destined for the IAB node's DU, an F1-C message that contains SRB data for a WTRU 302 directly connected to the IAB node 304a, and/or an F1-U message that contains DRB data for a WTRU directly connected to the IAB node 304a). In examples, the IAB node 304a-c may employ routing and/or mapping tables to determine where to forward the data. Each IAB node 304a-c may have a routing table (e.g., configured by the IAB donor CU 310), which may contain the next hop identifier for each BAP routing ID. The DL and UL direction may maintain separate routing tables. The DL table may be used by the DU part 306a-c of the IAB node 304a-c and the MT part 308a-b of the IAB node 304a-b may use the UL table.

Backhaul (BH) RLC channels may be used for transporting packets between IAB nodes 304 a-c (or between an IAB-donor DU 306c and an IAB node 304b). A BH RLC channel configuration may contain the associated RLC and/or logical channel configuration. Many-to-one (N:1) or one-to-one (1:1) mapping may be performed between WTRU 302 radio bearers and BH RLC channels. The N:1 mapping may multiplex several WTRU 302 radio bearers into a single BH RLC channel based on specific parameters (e.g., QoS profile of the bearers). The N:1 mapping may be suitable for bearers that do not have very strict requirements (e.g., best effort bearers). The 1:1 mapping may map each WTRU 302 radio bearer onto a separate BH RLC channel. The 1:1 mapping may be designed to ensure finer QoS granularity at WTRU 302 radio bearer level. The 1:1 mapping may be suitable for bearers with strict throughput or/and latency requirements (e.g., guaranteed bit rate (GBR)) bearers and/or voice over internet protocol (VoIP) bearers).

If an IAB node 304a-c detects a BH radio link failure (RLF), the IAB node 304a-c may send a BH RLF indication to other nodes (e.g., to the IAB nodes 304a-c descendant nodes). The BH RLF indication may be a BAP control PDU. In response to receiving a BH RLF indication from a parent node, the IAB node 304a-c may initiate procedures such as re-establishment to another parent. The IAB node 304a-c may pause transmission and/or reception with the concerned parent. The behavior(s) on the reception of BH RLF indications may be part of an IAB/network implementation.

In a multi-hop IAB network, data congestion may occur on intermediate IAB node 304b, which may lead to packet drops (e.g., if left unresolved). In examples, higher layer protocols (e.g., TCP) may be used to assure reliability. TCP congestion avoidance and/or slow start mechanisms may be very costly to overall end to end performance (e.g. throughput degradation). Therefore, IAB networks may employ flow control. In examples, for the DL, E2E and H2H flow control mechanisms may be available.

The DL E2E flow control may be based on the DL data delivery status (DDDS) specified for CU/DU split architecture (e.g., in NR). In DDDS, the DU (e.g., in the context of IAB networks, the DU part of the access IAB node) may report to the CU (e.g., in the context of IAB networks, the donor CU 310, specifically, the CU-UP) different forms of information (e.g., the desired buffer size per DRB, desired data rate per DRB, the highest successfully delivered PDCP SN, lost packets (e.g., packets not acknowledged by the DU 306a-c at RLC 314a-b level), and/or the like). Access IAB nodes 304a-c (e.g., only access IAB nodes 304a-b) may perform DDDS (e.g., IABs may report only information concerning the DRBs of the WTRUs 302 they serve directly). Access IAB nodes 304a-c may provide no information regarding the BH RLC channels.

For DL H2H flow control, an IAB node 304a-c may generate a flow control message (which may be a BAP control PDU) (e.g., if the IAB node's 304a-c buffer load exceeds a certain level and/or if the IAB node's 304a-c receives a flow control polling message from a peer BAP entity (e.g., a child node)). The H2H flow control information may indicate the available buffer size. In examples, the indicated available buffer size may be at the granularity of BH RLC channels (e.g. available buffer=equals value_1 for BH RLC channel no. 1, available buffer equals value_2 or per BH RLC channel no. 2, etc.) In examples, indicated available buffer size may be at the granularity of destination routing ID (e.g., available buffer equals value_1 for destination routing ID equals address1, available buffer equals value2 for destination routing ID equals address2, etc.). The IAB node 304a-c receiving the flow control message may use the information to control the traffic flow towards the sender (e.g., throttling or pausing the traffic associated with certain BH RLC channel or/and destination if the flow control message indicated a low available buffer for the concerned traffic, increasing the traffic flow if the flow control was indicating a high available buffer value, etc.). The actions taken on flow control and the configurations and/or values of thresholds and other parameters to trigger flow control message (e.g., buffer threshold values, polling time durations (e.g., polling timers), etc.) may be part of an IAB/network implementation.

Pre-emptive buffer status reporting (BSR) may be implemented. An IAB node 304-a-c may trigger BSR to its parent node(s) before data (e.g., new data) has arrived in its UL buffer, (e.g., based on the BSR that the IAB node 304a-c received from its child nodes and/or the WTRUs 302, and/or based on scheduling grants the IAB nodes 304a-c provided to them (e.g., an indication of anticipated data)). In examples, an IAB node 304a-c may control the flow of UL data from its children nodes and/or the WTRUs 302 by the providing them with proper UL scheduling grants, (e.g., based on the BSR received from them). IAB nodes 304a-c may be assumed to be static nodes. Handover, also referred to as migration or relocation, of IAB nodes 304a-c from one donor to another may be supported for load balancing and/or for handling RLFs due to blockage (e.g., due to moving objects (e.g., vehicles), seasonal changes (e.g., foliage), and/or infrastructure changes (new buildings)). In examples, intra-donor CU 310 handover (e.g., only intra-donor CU handover) may be supported (e.g., the target and the source parent DUs of the IAB node 304a-c may be controlled by the same donor CU). In examples, inter-donor CU 310 handover maybe supported.

IAB connectivity may be supported via multi-RAT dual connectivity (MR-DC). For example, an IAB node 304a-c may be connected to the network via evolved new radio dual connectivity (EN-DC), where the master node may be an LTE node and the secondary node may be an NR node.

In examples, an IAB node 304a-c may be transparent (e.g., completely transparent) to WTRUs 302 (e.g., from a WTRU 302's point of view, IAB nodes 304a-c may appear to be normal base stations).

In examples, mobile IABs may be used to provide connectivity to one or more WTRUs 302, (e.g., if the one or more WTRUs 302 are on the move (e.g., on bus(es), train(s), airplane(s), and/or the like.)

An IAB node 304a-c may act as a fixed wireless access (FWA) point of connectivity for one or more WTRUs 302. For example, an IAB node 304a-c may be installed, e.g., outside of home(s), building(s), shopping mall(s), etc., and may provide connectivity to WTRUs 302 located indoors.

In examples wherein WTRUs 302 may be in close proximity of each other (e.g., on bus(es), on train(s), on airplane(s), in the same building, and/or the like), the location and/or position of the WTRUs 302 may be roughly the same for practical purpose(s). Performing positioning (e.g., WTRU-based or network-based) for each WTRU 302 (e.g., independently) may be below a threshold (e.g., below an optimal threshold). A reason to perform positioning of each WTRU 302 below a threshold may include the unnecessary WTRU 302 power consumption (e.g., for performing PRS measurements, for sending SRSs, for performing global navigation satellite system (GNSS) measurements, etc.). Another reason may include the unnecessary signaling and/ or resource utilization (e.g., sending of PRS(s), and/or sending of SRS(s), etc.), e.g., as when the positioning may be done via a mobile network. Another reason may include the low positioning accuracy of GNSS, (e.g., in the case of indoor WTRUs 302). Another reason may include the throughput loss of WTRUs 302. For example, when mobile network-based positioning (e.g., as measurement gap(s)) may be used by the WTRU 302 to perform the positioning related measurement(s).

Use(s) described herein of an IAB node are illustrative examples. For example, when a group of WTRUs 302 are in close vicinity with each other and may be served by same or neighboring node(s).

Method(s) applicable to a WTRU 302 may be applicable to entit(ies) such as IAB node(s) 304a-c that may be served by another IAB node 304a-c (e.g., an IAB node 304a-c that has WTRU-like functionality).

In examples, method(s) described herein may consider GNSS as an alternative to cellular network-based positioning available to the WTRU 302. A plurality of positioning methods not based on mobile networks may be available as described herein. In examples, the method(s) that utilize a GNSS location (e.g., to verify a location provided by a delegate) may apply.

The terms position delegate or location delegate may be used to refer to an entity (e.g., an IAB node 304a-c, and/or a gNB with a small coverage area, etc.) performing positioning related operation(s) (e.g., measurement(s), calculation(s), and/or reporting, etc.) on behalf of the WTRU 302.

An example of a non-limiting example of a node or entity (e.g., a network node or entity) that may be used for and/or to support positioning includes an LMF. Any other suitable node or entity may be substituted for the LMF and may be consistent with this application.

Performance of positioning for a plurality of WTRUs 302 (e.g., performing positioning related DL measurements, sending UL signaling for network based/assisted positioning, and/or performing positioning calculations, etc.) may be delegated to a node (e.g., an IAB node 306a-c serving a group of WTRUs 302). Delegating performance of positioning for a plurality of WTRUs 302 to a node may lead to one or more advantages (e.g. WTRU 302 power saving). For example, a subset of the plurality of WTRUs 302 (or none of the WTRUs 302, e.g., in the case that a network node may delegate the positioning on behalf of the WTRUs 302) may perform positioning related measurement(s), signaling, and/or calculation(s). For example, delegating positioning to a node may increase signaling and/or resource optimization (e.g., as less signaling may be used by the network and/or WTRU 302 for performing the measurements via a subset of the WTRUs 302 and/or a delegated node). For example, delegating positioning to a node may enhance positioning accuracies for indoor WTRUs 302 (e.g., as compared to indoor positioning via GNSS and/or via only GNSS). For example, delegating positioning to a node may improve throughput for the WTRUs 302, (e.g., as a subset of the WTRUs 302 or none of the WTRUs 302 (in the case of delegation to a network node)). The WTRU 302 may be involved in measurements related to positioning that may require measurement gap(s).

A node (e.g., an IAB node 304a-c, a gNB, etc.) may provide an explicit indication that the node is capable of delegating positioning measurement(s), determination, reporting, and/or the like to the WTRUs 302 that the node serves. For example, the delegate node and/or cell may broadcast positioning measurement(s), determination, reporting, and/or the like in the system information blocks (SIB(s)) of a serving cell. For example, this information may be provided in a dedicated manner (e.g., RRC/MAC signaling from a gNB, etc.).

A WTRU 302 may be configured by a network with information about one or more location delegates. For example, the one or more location delegates may be a cell or a list of cells (e.g., cell ID(s) of IAB node(s) 304a-c or small cell(s) capable of providing location delegation). Dedicated signaling (e.g., via RRC, MAC) and/or broadcasting in a current serving cell (e.g., via SIB(s)) may communicate the cell or list of cell information to the WTRU 302. The WTRU may be configured with the cell or list of cell information by application layer(s) and/or manually, etc.

The WTRU 302 may request from a network (e.g., a gNB, and/or a LMF) information associated with possible position delegates. The WTRU 302 may include information such as a current location, a current serving cell, and/or measurement(s) of neighbor cell(s), etc., in the request. The network (e.g., a gNB, and/or a LMF) may provide to the WTRU 302 information accordingly (e.g., a list of cell IDs). The network (e.g., a gNB, a LMF) may take the current WTRU 302 location (e.g., the current location and/or the current serving cell info provided by the WTRU 302) into consideration (e.g., when considering a list of possible delegates within the coverage area of the current serving cell or in its vicinity). The information may be provided in a dedicated message (e.g., a RRC message) or may be broadcasted (e.g., via SIB(s) of the current serving cell).

The indication of positioning delegation may be an implicit indication. For example, a cell may be broadcasting location information. A WTRU 302 may receive broadcasting of the location information from the cell. The location information may have an associated LPP session ID. The LPP session ID may be associated with a unique ID for the WTRU 302 (e.g., a radio network temporary identifier (RTNI)) or for a group of WTRUs 302, which may indicate that the node and/or cell has established an LPP session with the LMF on behalf of the WTRU 302.

An example of a benefit of an implicit indication of positioning delegation may be that the WTRU 302 does not need to send a request for assistance information to the LMF for positioning. Not needing to send a request for assistance information not the LMF for positioning may reduce latency associated with positioning.

In examples, a location delegate may be a node and/or cell that is serving a WTRU 302 (e.g., an IAB node 306a-c, and/or a gNB, etc.). The location delegate may be a primary cell (Pcell, and/or PSCell). The location delegate may be a secondary cell (Scell).

In examples, a WTRU 302 may connect to a node and/or cell that is a location delegate (e.g. if the WTRU 302 is handed over to a cell that provides location delegation, if a cell that provides location delegation is added as an Scell in carrier aggregation, if a cell that provides location delegation is added as a PSCell and/or SCG Scell in dual connectivity, etc.). When the WTRU 302 connects to a node and/or cell that is a location delegated, the WTRU 302 may send certain information to the network (e.g. an LMF). The information may indicate that the location of the node and/or cell may be assumed to be the location of the WTRU 302. The WTRU 302 may send the certain information to the network (e.g., including the WTRU 302's identity, a cell-RNTI (C-RNTI) associated with the master cell group (MCG) or secondary cell group (SCG), the cell ID of the location delegate, and/or the MT identity of the location delegate when the location delegate is an IAB node 306a-c, etc.). A gNB may send the information (e.g., on behalf of the WTRU 302 and/or forwarding the information provided by the WTRU 302).

In examples, when a WTRU 302 connects to a node and/or cell that is a location delegate, the WTRU 302 may keep performing the location measurement and/or determination and may compare the location measurement and/or determination with the location provided by the delegate. The WTRU 302 may determine whether the location difference between what the WTRU 302 has measured and what the delegate has provided is consistent over a duration (e.g., a given and/or configured duration, more or less the same, and/or different but the difference being the same during the given and/or configured duration, etc.). If the WTRU 302 determines the measurements are consistent, the WTRU 302 may send an indication (e.g., a starting indication) to the network that the location delegation has started. If the WTRU 302 determines the measurements are not consistent, the WTRU 302 may send an indication to the network that the location delegation may not be accepted.

In examples, when a WTRU 302 gets disconnected from a cell that is a location delegate (e.g. if the WTRU 302 is handed over to another cell, if the cell that was providing the location delegation was an SCell and the cell was released, and/or if the cell that was providing the location delegation was a PSCell and the SCG was released, etc.), information may be sent to the network (e.g. an LMF), which may indicate that the location of the cell may not (e.g., may no more) be assumed to be the location of the WTRU 302.

A location delegate may be a node and/or cell not currently serving the WTRU 302 (e.g., a neighbor node and/or cell, etc.). In examples, the WTRU 302 may receive condition(s) from a cell indicating when to consider the cell as a location delegate. For example, RSRP, reference signal received quality (RSRQ), and/or received signal-to-noise indicator (RSNI) threshold(s) may be configured and the WTRU 302 may consider the neighbor cell to be its location delegate, e.g., (e.g., only if) signal level(s) of the neighbor cell meets the configured threshold(s). For example, the WTRU 302 may keep performing the location measurement and/or determination and may compare the location measurement and/or determination with the location broadcasted by the neighbor cell. The WTRU 302 may consider (e.g., accept) the neighbor cell to be its location delegate if the location difference between what the WTRU 302 has measured and what the neighbor cell is broadcasting is consistent over a duration (e.g., a given configured duration, more or less the same, different but the difference being the same during the given and/or configured duration, etc.).

In examples, information indicating the location of a neighbor cell may also be assumed to be the location of a WTRU 302. This information indicating the location of a neighbor cell that assumes the location of the WTRU 302 may be sent to the network (e.g., an LMF) e.g., if the WTRU 302 determines that the neighbor cell fulfills the condition(s) to act as a location delegate. The information may be sent by the WTRU 302 to the network (e.g., including the WTRU 302's identity, a C-RNTI associated with the MCG or SCG, the cell ID of the location delegate, and/or the MT identity of the location delegate in the case that the location delegate is an IAB node, etc.).

In examples, information indicating the location of a neighbor cell may also be assumed to be the location of a WTRU 302. This information may further indicate that the neighbor cell may no longer be assumed to be the location of a WTRU 302. This information indicating the location of the neighbor cell can no longer be assumed to be the location of the WTRU 302 may be sent to the network (e.g., an LMF) e.g., if the WTRU 302 determines that the neighbor cell no longer fulfills the conditions to act as a location delegate. The information may be sent by the WTRU 302 to the network (e.g., including the WTRU 302's identity, a C-RNTI associated with the MCG or SCG, the cell ID of the location delegate, and/or the MT identity of the location delegate in the case that the location delegate is an IAB node, etc.).

A WTRU 302 may determine that a serving cell or a neighbor cell fulfills the condition(s) to act as a location delegate. The WTRU 302 may determine that there is some consistent location difference between the location determined by the WTRU 302 and the location provided by the delegate. The WTRU 302 may send the location difference information to the network based on the determination(s). For example, the location difference information may be included in the same message the WTRU 302 sends to the network indicating a location delegation. The WTRU 302 may send the location difference information if the WTRU 302 connects to a serving cell providing the location delegation and/or if the WTRU 302 has determined a neighbor cell fulfills the delegation.

A WTRU 302 may determine that a serving cell may be capable of acting as a position delegate. Upon determining that a serving cell may be capable of acting as a position delegate, the WTRU 302 may send a request to the network (e.g., a serving node and/or cell, the master node in the case of DC, an IAB node 306a-c, etc.) for location information. The request may be based on condition(s), such as that the WTRU 302 not capable of positioning, that RSRP of the synchronization signal block (SSB) from the serving cell is below a threshold, that the WTRU 302 has a pending request for location information from the network (e.g, LMF, etc.).

A WTRU 302 may not receive a location information from the delegate (e.g., in response to sending a request, and/or not getting location information according to an expected time for periodic location update(s), etc.). In response, the WTRU 302 may send a message to the network indicating that the WTRU may not receive location information. The WTRU 302 also may indicate a request for assistance information (e.g., PRS configuration(s)) and may perform positioning by itself.

A WTRU 302 may determine a serving cell's or a neighbor cell's location delegation capability. The WTRU 302 may stop performing location related measurement(s), and/or calculation(s) and/or sending of UL signaling related to measurement(s) (e.g., sending UL SRS measurement(s), and/or sending PRS measurement report(s), etc.).

A WTRU 302 may be configured with a time duration to wait. In examples, the WTRU may respond to expiration of the time duration and/or may stop positioning related activities (e.g., in response to determining about the serving cell's and/or neighbor cell's location delegation capability). The WTRU 302 may specify a distance and/or location value and/or range (e.g., instead of or in addition to the time duration). In examples the WTRU 302 may make this specification if the WTRU 302 is not moving, and/or is not moving by more than a certain distance, etc.

A WTRU 302 may determine the unavailability of a location delegate (e.g., in response to disconnecting from a serving cell that is a location delegate and/or if the signal level of a neighbor cell that is a location delegate falls below a certain threshold). In response, the WTRU 302 may start performing location related measurement(s), calculation(s), and/or sending of UL signaling related to measurements (e.g., sending UL SRS measurements, sending PRS measurement reports, etc.). The WTRU 302 may send a message to the network indicating a request for assistance information (e.g., PRS configuration(s)) and may perform positioning by itself.

A WTRU 302 may be sent an explicit message from the network to delegate positioning (e.g., to one of the WTRU 302's serving cells, to a neighbor cell, etc.). The WTRU 302 may stop performing the positioning related operations by itself (e.g., immediately, after a given time, for a given duration, while being stationary after the reception of the message, etc.)

A WTRU 302 may be sent an explicit message from the network to stop an ongoing position delegation. The WTRU 302 may start and/or resume performing the positioning related operations by itself (e.g. immediately, after a given time, for a given duration, while being stationary after the reception of the message, etc.).

Location information may be communicated amongst a position delegate, a WTRU 302, and/or a network. For example, the delegate may provide location information to the WTRUs 302 from the position delegate in a broadcast fashion (e.g., via SIB broadcasting). For example, the delegate may provide location information to the WTRUs 302 via dedicated signaling (e.g., RRC, and/or MAC, etc.). For example, the WTRUs may request the location information from the position delegate by sending a dedicated message (e.g., RRC, and/or MAC, etc.). For example, the location information provided from the delegate to a WTRU 302 may contain more than one location. For example, the location information may be a set of time and/or location values containing historical location values from the delegate (e.g., the location in the last 10 minutes, and/or the location for every one minute). For example, the location information may contain a set of time and/or location values, where some of the values may be referring to future anticipated location(s) (e.g., if the delegate is a moving IAB node 306a-c that has a pre-determined path, such as a train and/or tram, etc.).

A WTRU 302 may subscribe to receiving location information updates (e.g., periodically every x number of milliseconds (ms), every time the location changes by y meters, etc.) from the position delegate. The WTRU 302 may send the request to the location delegate, the gNB serving the WTRU 302 directly or indirectly (e.g., in the case of IAB networks), and/or an LMF. The WTRU 302's subscription for location information may be valid for a time duration (e.g., a certain time duration, such as for the next 30 minutes) and/or a location duration (e.g., until the location has not changed by more than 400 ms, etc.)

A WTRU 302 may request location information (e.g., one-time, periodic subscription, etc.). The WTRU 302 may include time duration information for the location (e.g., location information for every one minute in the last 10 minutes, location information for every one minute for the last five minutes and the five next minutes, etc.)

The delegate may receive as part of the location information an indication about a validity duration of the location information (e.g., the provided location is valid for one minute). The WTRU 302 may be informed (e.g., during the configuration and/or determination of the position delegate) for how long the location information received from the delegate remains valid.

A WTRU 302 may receive a positioning request from the network (e.g., an LMF, a gNB). As a response, if available, the WTRU 302 may return the location information obtained from the location delegate. The location information may include information about the position delegate (e.g., cell ID of the gNB/IAB node that is a position delegate). The WTRU 302 may include the location information in a LPP message (e.g., in a request for assistance information) and may send it to the LMF (e.g., if the LPP session is active). If the LPP session is not active, the WTRU 302 may send the location information to the serving gNB (e.g., via UCL, MAC-CE and/or RRC). The serving gNB may forward the location information to the LMF (e.g., via NRPPa).

A location delegate may send its location information to the network (e.g., a gNB, an LMF, etc.) in response to a request from the network (e.g., responding to an explicit request, configured to report periodically, etc.). The network may distribute that location information (e.g., via RRC signaling) to the WTRU(s) 302 (e.g., in response to request(s) from the WTRUs 302, periodically, in a push manner without explicit WTRU request(s) and/or update subscription(s), etc.)

A delegate may include time information in the location information it provides. The time information included in the location information may indicate when that location was determined.

A delegate may provide the location information (e.g., the exact location information) periodically (e.g., every x number of milliseconds on the SIB)

A delegate may provide the location information (e.g., the exact location information), e.g., if (e.g., only if) the location has changed by a certain amount (e.g., by a relative margin, and/or by an absolute margin).

A delegate may provide the location information (e.g., the exact location information) less frequently and may provide the delta from the previous provided exact location information more frequently (e.g., every five seconds the exact location is provided, and the difference from the previous exact location is provided every once second).

The MT of an IAB node 306*a-c* may perform positioning (e.g., using NR positioning, GNSS positioning, etc.) and may communicate this information to the WTRUs 302 that the IAB node 304*a-c* serves.

For example, the location information may be provided to the WTRUs 302 and/or child IAB nodes 304*a-c* in a broadcast fashion (e.g., via SIB broadcasting). For example, the location information may be provided to the WTRUs 302 and/or child IAB nodes 3064*-c* via dedicated signaling (e.g., MAC and/or BAP, etc.). For example, the WTRUs 302 or child IAB nodes 304*a-c* may request the location information from the IAB node, e.g., by sending a dedicated message (e.g., MAC and/or BAP, etc.).

For example, the WTRUs 302 or child IAB nodes 304*a-c* may request the location information from the IAB node via a gNB (e.g. via RRC message(s) sent to the donor gNB, which may then forward the request to the IAB node). The IAB node 304*a-c* may send the location information (e.g., directly) to a WTRU 302 and/or a child IAB node 304*a-c* (e.g. via MAC and/or BAP). The IAB node 304*a-c* may send the location information via SIB signaling. The IAB node 304*a-c* may send the location information or the IAB node 304*a-c* may send the information to the gNB. The gNB may forward the information to the WTRU 302 (e.g. via RRC). The WTRU 302 may send a request to an LMF, and the LMF may forward the location information of the serving IAB node 304*a-c* to the WTRU 302.

The WTRU(s) 302 and/or child IAB node(s) 304*a-c* may consider the serving IAB node and/or cell to be a location delegate (e.g., in response to determining the cell belongs to a mobile IAB node). For example, the WTRU(s) 302 and/or child IAB node(s) 304*a-c* may determine the location delegate based on the IAB node broadcasting that the IAB node is mobile and/or that the WTRU 302 is configured with PCI value(s) associated with the cells of mobile IAB nodes 304*a-c*, etc.

The IAB node 304*a-c* (e.g., an IAB-MT) may send its location information to the network (e.g., a gNB and/or a LMF, etc.) in response to a request from the network (e.g., responding to an explicit request, and/or configured to report periodically, etc.). The network may distribute the location information of the IAB node 304*a-c* (e.g., via RRC signaling) to the WTRUs 302 and/or child nodes of the IAB node 304*a-c* (e.g., in response to request(s) from the WTRUs 302 or child nodes, periodically, in a push manner without explicit WTRU 302 request(s) or update subscription(s), etc.).

A WTRU 302 may send a request to the network for locations of IAB nodes 304*a-c* in the serving cell, e.g., based on a condition (e.g., if RSRP of SSB from the serving cell is below a threshold). The WTRU 302 may receive a list of IAB nodes 304*a-c* (e.g., cell IDs) in the serving cell (or in the vicinity of the serving cell) from the network (e.g., a LMF and/or a gNB). The WTRU 302 may receive the list in SIB(s) from the serving gNB and/or via a dedicated message.

If a WTRU 302 connects to an IAB node 304*a-c* that provides location delegation, information may be sent to the LMF. The information may indicate that the location of the IAB node 304*a-c* may be assumed to be the location of the WTRU 302. The WTRU 302 may send the information (e.g., directly) to the LMF. The donor gNB may send the information.

If a WTRU 302 gets handed over from an IAB node 304*a-c* that provides position delegation to another node (e.g, an IAB node 304*a-c* and/or a gNB) that does not provide position delegation, information may be sent to the LMF indicating that the location of the IAB 304*a-c* node may no longer (e.g., may no more) be associated with the location of the WTRU 302. The information may be sent by the WTRU 302 to the LMF (e.g., directly). The donor gNB may send the information.

An IAB node 304*a-c* (e.g., an IAB node MT), the donor gNB, the AMF and/or another network unit may send information to the LMF that contains the information about the cells (e.g., PCIs, CGIs, etc.) served by the IAB node 304*a-c* (e.g., an IAB node DU 304*c*). WTRUs 302 connecting to and/or disconnecting from an IAB node 304*a-c* that delegates position information may send the information regarding the connection and/or disconnection to the IAB node 304a-c, e.g., by indicating the cell of the IAB node 304a-c that serves them. The gNB (e.g., the donor gNB) may send the information to the LMF, e.g., in response to the WTRUs 302 getting connected to/disconnected from the IAB node 304a-c.

The IAB node 304a-c may inform a WTRU 302 or an IAB child node that the IAB node 304a-c serves about the identity of the IAB node 304a-c's MT (e.g., via SIB broadcasting, MAC, BAP, etc.). The association at the LMF between the WTRU 302 and/or the child IAB node 304a-c and/or the parent IAB node 304a-c designated as the position delegate may be established and/or implemented via this IAB identity. For example, a WTRU 302 and/or a gNB may send the identity of the MT to the LMF in the case that the WTRU/gNB gets connected to/disconnected from an IAB node 304a-c. The LMF may associate/disassociate the location of the MT and the concerned WTRU 302 (e.g., from there onwards).

If an IAB node 304a-c starts and/or stops acting as a position delegate for a WTRU 302 (e.g., a certain WTRU 302), the IAB node 304a-c may communicate the information to the LMF (e.g., including a WTRU 302 identity and/or the IAB node 304a-c's identity, e.g., a MT identity, an IAB cell identity, etc.)

The delegate IAB node 304a-c may request a measurement gap, e.g., for positioning dependent on a plurality of WTRUs 302 and child IAB nodes 306a-c that the delegate IAB node 304a-c serves. For example, a longer measurement gap may be requested if the delegate IAB node 304a-c serves many WTRUs 302 to get a more accurate positioning measurement.

The delegate IAB node 304a-c may request a measurement gap, e.g., for positioning dependent on the load that the IAB node 304a-c is experiencing. For example, the load may be UL/DL data pending transmission at the IAB node 304a-c and longer measurement gap(s) for positioning may exacerbate congestion at the IAB node 304a-c.

A WTRU 302 may be configured to conditionally perform positioning related measurements and/or signaling. For example, a WTRU 302 may be configured to perform location determination (e.g., its own location determination). For example, a WTRU 302 may be configured to give assistance to the network (e.g., performing GNSS measurement(s), performing DL PRS measurement(s), sending positioning SRS(s) to the network, etc.), e.g., based on threshold(s) related to a WTRU 302 battery level. For example, the WTRU 302 may be configured to stop measurement(s) (e.g., PRS and/or GNSS) and/or UL signaling related positioning when the WTRU 302 battery level falls below a configured threshold. For example, the WTRU 302 may be configured to start the measurement(s) or UL signaling when the WTRU 302 battery level rises above a configured threshold. Different power level thresholds may be configured for different aspects of location determination or assistance information provision (e.g., a threshold_1 related to the performance of GNSS measurement(s), a threshold_2 related to the performance of DL PRS measurement(s), and/or a threshold_3 related to the performance of UL SRS signaling, etc.)

A WTRU 302 may be configured to perform location determination (e.g., its own location determination) and/or may be configured to give assistance to the network (e.g., performing GNSS measurement(s), performing DL PRS measurement(s), and/or sending positioning SRS(s) to the network, etc.), e.g., based on WTRU 302's overheating level. For example, the WTRU 302 may be configured to stop measurement(s) (e.g., PRS, and/or GNSS) and/or UL signaling related positioning when the WTRU 302's overheating level rises above a configured threshold. The WTRU 302 may be configured to start the measurement(s) and/or UL signaling when the WTRU's overheating level falls below a configured threshold. Different overheating level thresholds may be configured for different aspects of location determination and/or assistance information provision (e.g., a threshold_1 related to the performance of GNSS measurement(s), a threshold_2 related to the performance of DL PRS measurement(s), and/or a threshold_3 related to the performance of UL SRS signaling, etc.).

A WTRU 302 may be configured to perform location determination (e.g., its own location determination). A WTRU 302 may be configured to give assistance to the network (e.g., performing GNSS measurement(s), performing DL PRS measurement(s), and/or sending positioning SRS(s) to the network, etc.). The WTRU 302's configuration may be based on, e.g., threshold(s) related to the WTRU's UL/DL data throughput. For example, the WTRU 302 may be configured to stop measurement(s) (e.g., PRS, and/or GNSS) and/or UL signaling related positioning when the UL/DL throughput rises above a configured threshold. The WTRU 302 may be configured to start the measurement(s) and/or UL signaling when the UL/DL throughput falls below a configured threshold. Different thresholds may be provided for UL and DL throughput levels. Different thresholds may be configured for the different aspects of location determination or assistance information provision (e.g., a UL throughput threshold_1 related to the performance of GNSS measurement(s), a DL throughput threshold_2 related to the performance of DL PRS measurement(s), a DL throughput threshold_3 related to the performance of DL PRS measurement(s), and/or a UL throughput threshold_4 related to UL SRS signaling, etc.).

A WTRU 302 may be configured to perform location determination (e.g., its own location determination). A WTRU 302 may be configured to give assistance to the network (e.g., performing GNSS measurement(s), performing DL PRS measurement(s), and/or sending positioning SRS(s) to the network, etc.). The WTRU 302's configuration may be based on, e.g., threshold(s) related to a WTRU 302's UL/DL buffer level (e.g., an absolute level or a percentage level available, an absolute level or a percentage level used, etc.). For example, the WTRU 302 may be configured to stop measurement(s) (e.g., PRS, and/or GNSS) and/or UL signaling related positioning when the available UL/DL buffer rises above a configured threshold. The WTRU 302 may be configured to start the measurement(s) or UL signaling when the available UL/DL buffer falls below a configured threshold. Different thresholds may be provided for UL and DL buffer levels. Different thresholds may be configured for the different aspects of location determination or assistance information provision (e.g., a UL available buffer threshold_1 related to the performance of GNSS measurement(s), a DL threshold_2 related to the performance of DL PRS measurement(s), a DL buffer threshold_3 related to the performance of DL PRS measurement(s), and/or a UL buffer threshold_4 related to UL SRS signaling, etc.).

A WTRU 302 may be configured to perform location determination (e.g., its own location determination). A WTRU 302 may be configured to give assistance to the network (e.g., performing GNSS measurement(s), performing DL PRS measurement(s), and/or sending positioning SRS(s) to the network, etc.). The WTRU 302's configuration may be based on, e.g., threshold(s) related to DL signal level(s) of the serving cell. For example, the WTRU 302 may be configured to stop measurement(s) (e.g., PRS, and/or GNSS) and/or UL signaling related positioning if the DL signal level (e.g., RSRP) of a serving cell rises above a certain level and/or within a certain range. The WTRU 302 may be configured to start the measurements or UL signaling if the serving cell's signal falls below a certain level. Different DL signal level thresholds may be configured for the different aspects of location determination or assistance information provision (e.g., a threshold_1 related to the performance of GNSS measurement(s), a threshold_2 related to the performance of DL PRS measurement(s), and/or a threshold_3 related to the performance of UL SRS signaling, etc.).

A WTRU 302 may be configured to perform location determination (e.g., its own location determination). A WTRU 302 may be configured to give assistance to the network (e.g., performing GNSS measurement(s), performing DL PRS measurement(s), and/or sending positioning SRS(s) to the network, etc.). The WTRU 302 configuration may be based on threshold(s) related to current UL power level(s). For example, the WTRU 302 may be configured to stop measurement(s) (e.g., PRS, and/or GNSS) and/or UL signaling related positioning when the WTRU 302 uses an UL power level above a certain level or within a certain range (e.g., an absolute power level or a percentage of the maximum WTRU 302 power level). The WTRU 302 may be configured to start the measurement(s) or UL signaling when the power level is below a certain level. Different UL power level thresholds may be configured for the different aspects of location determination or assistance information provision (e.g., a threshold_1 related to the performance of GNSS measurement(s), a threshold_2 related to the performance of DL PRS measurement(s), and/or a threshold_3 related to the performance of UL SRS signaling, etc.).

Regarding implementing the methods described herein, the WTRU 302, e.g., may be configured to perform the location determination in manner(s) other than stopping and/or starting the location determination based on the different conditions. For example, if one or more of the conditions related to a WTRU 302 battery level, a WTRU 302 overheating level, a WTRU 302 throughput level, a WTRU 302 buffer level, a WTRU 302 DL signal level, and/or a UL power usage level are fulfilled, the WTRU 302 may perform the location measurement(s) in a relaxed manner. If the condition(s) are not fulfilled (e.g., anymore), the WTRU 302 may perform the location measurement(s) normally.

A WTRU 302 may be configured to conditionally report positioning information to the network. For example, a WTRU 302 may be configured to conditionally report its location information (e.g., location gathered via GNSS and/or DL PRS measurement(s)), depending on the difference between the location the WTRU 302 has determined and the location the positioning delegate (e.g., an IAB node 304*a-c*) provides to the WTRU 302. The difference may be referred to as location disparity. For example, a threshold value (e.g., in meters) may be specified, e.g., wherein the WTRU 302 may send a location report to the network if (e.g., only if) the location disparity stays above the threshold value.

For example, the WTRU 302 may be configured to report its location if (e.g., only if) the location disparity persists for a certain duration (e.g., x ms).

For example, the WTRU 302 may be configured with a set of values for the location disparit(ies) and the duration(s) of the location disparit(ies) detected. In examples, the WTRU 302 may be configured to report the location if a disparity of 0.5 meters is detected for more than five seconds, or a disparity of one meter is detected for more than three seconds, and/or a disparity of four meters is detected for more than two seconds.

For example, the WTRU 302 may be configured to report its location if (e.g., only if) the location disparity is detected for more than a number of times (e.g., three times). For example, the WTRU 302 may be configured with a set of values for the location disparit(ies) and a number of location disparit(ies) detected. For example, the WTRU 302 may be configured to report the location if a disparity of 0.5 meters is detected for more than five times, or a disparity of one meter is detected for more than three times, and/or a disparity of four meters is detected for more than one time.

For example, a WTRU 302 may be configured to report its location information depending on timing information (e.g., instead of, and/or or in addition to, the location disparity). In examples, the WTRU 302 may be configured to report the location every x ms, e.g., regardless of any location report sent due to other triggers (e.g., the location disparity). If a location disparity triggers a location report, a time duration (e.g., a timer) associated with periodic reporting may be restarted.

For example, a WTRU 302 may be configured to report its location information, e.g., depending on a change of location (e.g., absolute or relative). In examples, the WTRU 302 may be configured to report the location whenever its location changes by x meters from the previous time the location report triggered due to location change, e.g., regardless of any location report sent due to other triggers (e.g., the location disparity and/or timing related location reporting). The WTRU 302 may be configured to maintain a location included in an earlier location report sent due to location change. The WTRU 302 may use the location as a base line location for determining location change. If a location disparity or timing information triggers a location report, the last reported WTRU 302 location may updated to the location included in the last location report.

For example, a WTRU 302 may be configured to report its own location information, e.g., based on threshold(s) related to the WTRU 302 power. In examples, the WTRU 302 may be configured to stop reporting location information when the WTRU 302 battery level falls below a configured threshold. The WTRU 302 may be configured to start the reporting when the WTRU 302 battery level rises above a configured threshold.

For example, a WTRU 302 may be configured to report its own location information, e.g., based on threshold(s) related to a WTRU 302 overheating level. In examples, the WTRU 302 may be configured to stop reporting location information when the WTRU 302 overheating level rises above a configured threshold. The WTRU 302 may be configured to start the reporting when the WTRU 302 overheating level falls below a configured threshold.

For example, a WTRU 302 may be configured to report its own location information, e.g., based on threshold(s) related to WTRU 302 activity. In examples, the WTRU 302 may be configured to stop and/or skip reporting location information when the WTRU 302 has data to send. The WTRU 302 may be configured to defer sending of location report(s) until it has other data to send.

For example, a WTRU 302 may be configured to report its own location, e.g., based on threshold(s) related to DL signal level(s) of the serving cell (e.g., signal level(s) of SSB, CSI-RS, and/or PRS). In examples, the WTRU 302 may be configured to stop reporting its location when the DL signal level (e.g., a RSRP) of a serving cell rises above a certain level and/or within a certain range. The WTRU 302 may be configured to start the reporting when the serving cell falls below a certain level.

For example, a WTRU 302 may be configured to report its own location, e.g., based on threshold(s) related to DL signal level(s) of a neighboring cell (e.g., signal level(s) of SSB, and/or PRS). In examples, the WTRU 302 may be configured to stop reporting its location when the DL signal level (e.g., a RSRP) of a neighboring cell rises above a certain level or within a certain range. The WTRU 302 may be configured to start the reporting when the serving cell falls below a certain level.

Regarding implementing the methods described herein, the WTRU 302, e.g., may be configured to perform the location determination in manner(s) other than stopping and/or starting the reporting of its location based on the different conditions. For example, the WTRU 302 may perform the location reporting less frequently if one or more of the conditions described herein are fulfilled (e.g., the location disparity is low, and/or the WTRU 302 battery level falls below a threshold, etc.). The WTRU 302 may send more frequent location reports, e.g., when the location disparity is high.

A WTRU may request to delegate/stop positioning. For example, a WTRU 302 may send a request to the network (e.g., an IAB node 304*a-c*, a gNB, an LMF, etc.) wherein the request may indicate that the WTRU 302 prefers to delegate its positioning. For example, the WTRU 302 may send a request to the network, wherein the request may indicate the reason for the delegation (e.g., a low battery level, and/or WTRU overheating, etc.). The network may respond to the WTRU 302 with a confirmation. The confirmation may indicate to the WTRU 302 to stop the performance of the positioning measurements and/or determination. The confirmation may indicate to the WTRU 302 to perform the measurements and/or determination conditionally (e.g., as described herein).

A WTRU 302 may send a request to the network (e.g., an IAB node 304*a-c*, a gNB, an LMF, etc.), wherein the request may indicate that the WTRU 302 prefers to not send location information. For example, the WTRU 302 may send a request to the network, wherein the request may indicate the reason for not preferring to send the reporting the delegation (e.g., a low battery level, and/or WTRU 302 overheating, etc.). The network may respond to the WTRU 302 with a confirmation. The confirmation may indicate to the WTRU 302 to stop reporting its position and/or report them conditionally (e.g., as described herein). In examples, a request to stop reporting its position and/or report them conditionally may be a message (e.g., a new message, and/or a message not associated with an existing message). In examples, a request to stop reporting its position and/or report them conditionally may be a modification of a message (e.g., an existing message), such as the WTRU 302 assistance information.

A WTRU 302 may continue performing measurements via a non-mobile based implementation (e.g., via GNSS). The WTRU 302 may be configured to send an indication to the network to delegate the positioning, e.g., if the location determined becomes less accurate (e.g., if the WTRU 302 goes indoor and location information becomes unavailable and/or less reliable).

Accuracy and/or delta of the location information provided by a position delegate may be determined. For example, a WTRU 302 may be configured with timing information (e.g., a specified time duration). The WTRU 302 may be configured with location margin information (e.g., an absolute and/or a relative offset) that may relate to performing measurements. The WTRU 302 may be configured with location margin information while connected to a node that may be a position delegate. For example, the WTRU 302 may be configured to keep performing the positioning measurement(s) for a specified duration (e.g., in response to connecting to the position delegate). For example, the WTRU 302 may be configured to compare the location information that it determined (e.g., based on the position measurement(s)) with the location information provided by the delegate.

For example, during a specified duration, the WTRU 302 may determine a location to be the same as the location provided by the position delegate, within a specified absolute and/or relative location margin. The WTRU 302 may consider the location determination provided by the delegate to be accurate enough and may stop performing the location determination (e.g., performing the GNSS or PRS measurement(s)). The WTRU 302 may send an indication (e.g., a stopping indication) to the network (e.g., a LMF), e.g., indicating that the WTRU 302 has checked the location accuracy provided by the delegate and has stopped performing the measurement(s).

A WTRU 302 may keep comparing the location disparity between the location information it has determined and the indication provided by the position delegate for a certain specified duration. The WTRU 302 may determine the difference between the two (e.g., above a certain margin). The WTRU 302 may determine if the difference is consistent (e.g., within another specified margin of x meters). The WTRU 302 may consider the location information provided by the delegate to be accurate and may stop the location determination (e.g., performing the GNSS and/or PRS measurement(s)). The WTRU 302 may send an indication to the network (e.g., a LMF), e.g., indicating that the WTRU 302 has checked the location accuracy provided by the delegate and/or has detected a consistent difference (e.g., a consistent difference of x meters) between the two and has stopped performing the measurement(s). In response, the LMF may apply, e.g., the difference on top of the location provided by the delegate to determine a more accurate location of the WTRU 302.

The WTRU 302 may be configured to start (e.g., sporadically or periodically) the location measurement(s) and/or determination, e.g., to check if the location provided by the delegate remains accurate and/or the difference remains consistent. For example, the WTRU 302 may be configured to perform the location determination/comparison every one minute. The WTRU 302 may send an indication to the network if the location information remains accurate and/or consistent.

The methods described herein for performing and/or determining location may be applicable when the network performs the location determination (e.g., based on PRS measurement reports sent by the WTRU 302 and/or the WTRU 302 sending SRSs). For example, the WTRU 302 may send the PRS measurement(s) periodically during the time it is connected to a location delegate. The network may determine the WTRU 302's location based on the report(s). The network may compare the determined WTRU 302's location with the location reported by the delegate. The network may consider a consistent delta value reported (e.g., earlier) by the WTRU 302. If the network (e.g., a LMF) determines that the location is not valid (e.g., anymore), the network may send an indication to the WTRU 302. The indication may indicate that the WTRU 302 may, e.g., start performing the location measurement and/or determination, may start sending the location reports, and/or may start sending the UL SRS signals for location determination by the network. In examples, the WTRU 302 may send to the network the location that was determined via another means (e.g., via GNSS) based on some configuration (e.g., periodically). The network may use the information to compare and/or determine the location accuracy of the delegate for the WTRU 302.

A WTRU 302 may be configured to select one or more of a plurality position delegates. For example, a plurality of delegates may be available to a given WTRU 302. One or more of the plurality of position delegates may fulfill the location delegation requirements and/or conditions of the WTRU 302 (e.g., where the signal level between the position delegate and the WTRU 302 rises above a required threshold). The one or more of the plurality of position delegates that fulfill the location delegation requirements of the WTRU 302 may be referred to as candidate position delegates.

The WTRU 302 may be configured to determine the details of the positioning capabilities of the position delegates. For example, the WTRU 302 may be configured to determine the positioning method employed by the delegate (e.g., UE-assisted, UE-based, DL-based, and/or UL-based, etc.). For example, the WTRU 302 may be configured to determine an accuracy level and/or estimate of the positioning performed by a position delegate (e.g., confidence interval in percentage or absolute values, and/or confidence and/or accuracy level and/or percentage, etc.). For example, the WTRU 302 may be configured to determine how position delegation is provided. Methods of providing position delegation that the WTRU 302 may determine include, e.g., push mechanisms such as broadcast (e.g., which may include information about location broadcast periodicity), pull mechanism such as by WTRU 302 request, and/or a combination where the WTRU 302 can request and/or subscribe for a location delegation and the position delegate can provide the location to the WTRU 302 on an agreed upon periodicity (e.g., supported periodicities).

The WTRU 302 may receive the information about the capabilities of the position delegate from the position delegate itself (e.g., directly or indirectly). For example, the WTRU 302 may send a request to the position delegate to send its positioning capabilities and/or current positioning mechanism. For example, the WTRU 302 may be provided with information about the position delegate capabilities and/or current positioning mechanism being used via broadcast signaling from the position delegate.

Alternatively or additionally, the WTRU 302 may receive the information about the capabilities of one or more position delegates from the network (e.g., current serving gNB, and/or LMF, etc.). In examples, the information about the capabilities of one or more position delegates (e.g., received from the network) may include a list of pairs of position delegates' identities (e.g., mobile cell ID) and corresponding capabilities. For example, the WTRU 302 may send a request to the network (e.g., current serving gNB, LMF, etc.) about the position delegate capabilities and/or current positioning mechanism being used by a specific position delegate. In some examples, the WTRU 302 may send a request to the network (e.g., current serving gNB, and/or LMF, etc.) for a list of position delegates that have certain positioning capabilities.

The WTRU 302 may be configured to choose the position delegate (e.g., out of the one or more position delegates that fulfill the location delegation requirements/conditions of the WTRU 302) that fulfills, e.g., best signal level (e.g., RSRP, RSRQ, etc.), most accurate, that can provide location via push mechanism, and/or more frequent updates; etc.

The WTRU 302 may consider handover, cell reselection, and/or measurement capabilities of one or more serving cells when determining position delegation.

In examples, the WTRU 302 may be configured to apply a positive offset on top of the measurements of cells (e.g., current serving cell, and/or neighbor cell, etc.) that can provide position delegation. Alternatively or additionally, the WTRU 302 may be configured to apply a negative offset on top of the measurements of cells (e.g., current serving cell, and/or neighbor cell, etc.) the does not provide position delegation. In examples, a handover and/or a cell reselection to a cell that supports position delegation may be prioritized as compared to a cell that does not support position delegation. For example, the WTRU 302 may perform a handover and/or cell reselection to a second neighbor cell that has marginally worse signal levels than a first neighbor cell, if the second cell supports position delegation and the first cell does not support position delegation.

The WTRU 302 may be configured with different offset values/ranges. For example, depending on the position capabilities of the delegate (e.g., any combination of different values or range of values for different accuracy levels, positioning methodology, periodicity of position update, and/or the like).

The WTRU 302 may be configured to apply the offsets (e.g., apply different offsets) depending on the current WTRU 302 conditions. For example, the WTRU 302 may be configured to apply the offsets and/or use a higher offset for position delegate cells if the battery level of the WTRU 302 falls below a certain level and/or the WTRU 302 determines that its own positioning determination is no longer accurate (e.g., the WTRU 302 falls below an accuracy threshold, such as when indoor, etc.).

The WTRU 302 may send location delegation request/interest to a mobile IAB node 304a-c (e.g., via a MAC CE). A mobile IAB (e.g., the MT of the mobile IAB) may send a request to the network (e.g., donor CU 310 and/or LMF, etc.) for positioning configuration (e.g., PRS configuration and/or SRS configuration). For example, the mobile IAB, upon receiving a certain number of delegation request from different WTRUs 302, and/or if more than a certain percentage of the WTRUs the mobile IAB serves, may send a delegation request. The request may indicate the reason for the requested positioning configuration (e.g., including information about the number or percentage of WTRU 302s that requested the delegation, and/or what kind of positioning accuracy/mechanisms the WTRU 302s are interested in, etc.). The network may configure the mobile IAB with the desired positioning measurement and/or signaling configuration based on this request. The mobile IAB may inform the WTRUs 302 that requested the positioning delegation when the mobile IAB is ready to provide positioning delegation (e.g., broadcast signaling, and/or individual MAC CEs, etc.).

Figure 4A:
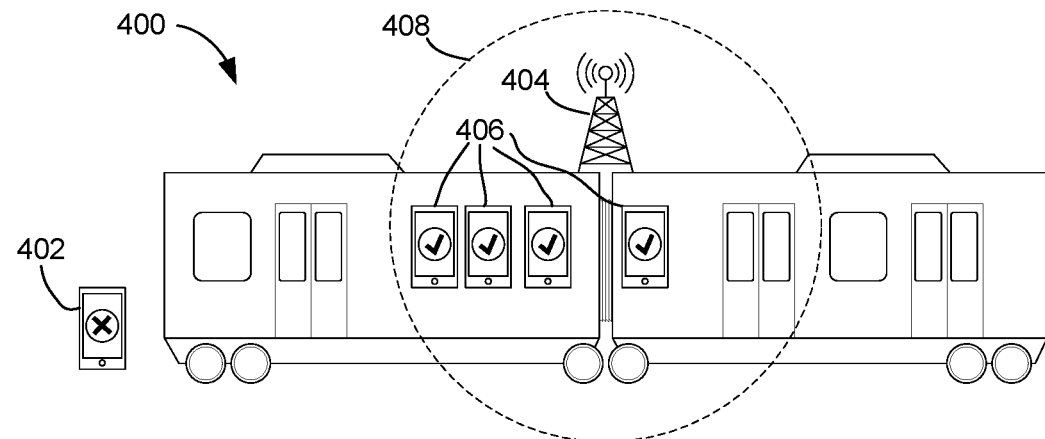
FIG. 4A illustrates an example of a WTRU performing its own location measurements and determinations while a network device is connected to a moving train.
Figure 4B:
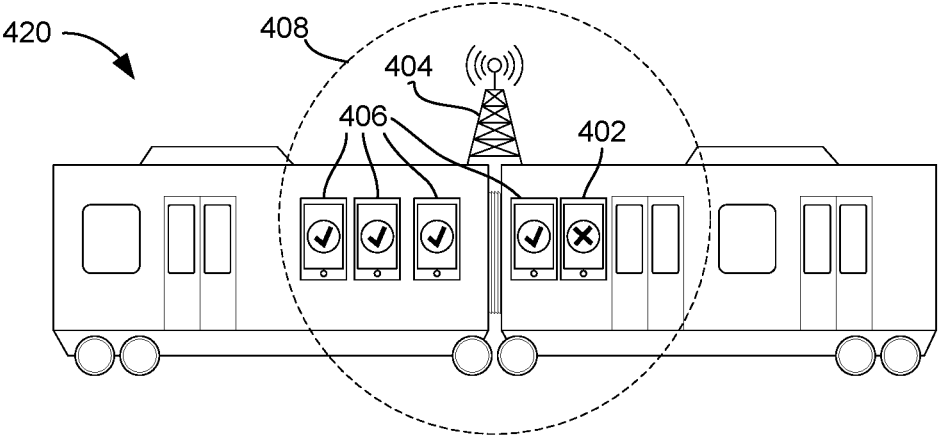
FIG. 4B illustrates an example of a WTRU starting to use a selected positioning delegate located on a moving train.
Figure 4C:
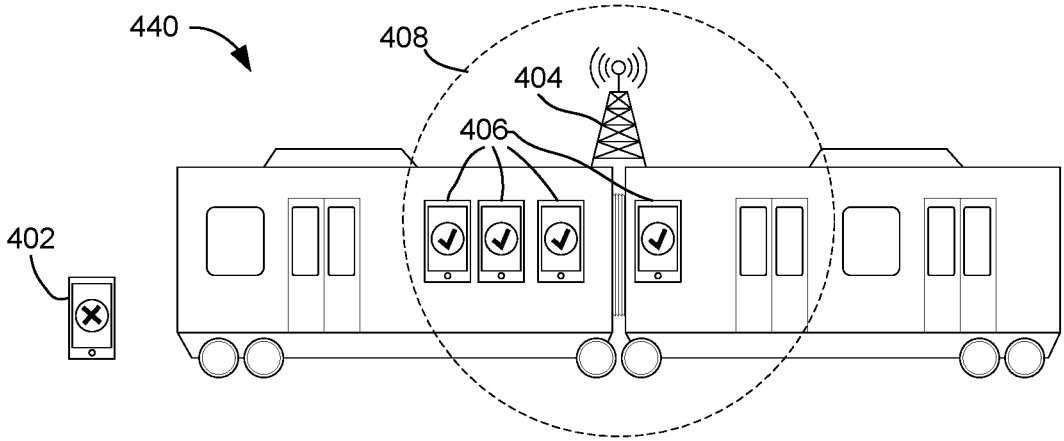
FIG. 4C illustrates an example of a WTRU stopping the use of a positioning delegate and re-starting its own location measurements and determinations while a network device is connected to a moving train.

FIGS. 4A-C illustrate a WTRU 402 requesting, engaging, and eventually stopping to use a delegation candidate. In FIG. 4A, a system 400 may include a moving train. The moving train may include a network device 404 (e.g., an IAB node) connected to a network and a plurality of WTRUs 406. In the system 400, a WTRU 402 may be located outside of a coverage area 408 of the network device 404 (e.g., and outside of the train), and as such, may perform its own location determination and/or measurements.

In the system 420 (e.g., referring to FIG. 4B), the WTRU 402 may enter the coverage area 408 of the network device 404. The WTRU 402 may connect to the network device 404. The WTRU 402 may select the network device 404 as a positioning delegate. For example, the WTRU 402 may start using the location information and/or measurements of the network device 404 and/or may stop performing its own location determination and/or measurements. In some examples, the WTRU 402 may receive the location determination and/or measurements of the network device 404 via broadcast information received from the network device 404 and/or in one or more messages sent from the network device 404 in response to a request sent by the WTRU 402. In some examples, the WTRU 402 may receive positioning configuration information (e.g., from the network device 404, for example, upon entering the coverage area 408). The positioning configuration information may include an indication of one or more positioning delegation candidates for the WTRU 402.

The positioning configuration information may include an indication of one or more conditions for starting or stopping positioning delegation. The WTRU 402 may determine to use the network device 404 as a positioning delegate based on a detection that a condition for starting positioning delegation has been satisfied. The WTRU 402 may send an indication (e.g., a starting indication) to the network (e.g., the network device 404) that indicates that the WTRU has started using the network device 404 as a positioning delegate. Further, in some examples, the WTRU 402 may send a location disparity report to the network device, wherein location disparity report indicates a difference between the location of the WTRU 402 and a location of the positioning delegate.

In the system 440 (e.g., referring to FIG. 4C), the WTRU 402 may exit the coverage area 408 of the network device 404, and in response, may stop using the network device 404 as a positioning delegate. For example, the WTRU 402 may detect that a condition for stopping positioning delegation has been satisfied. The WTRU 402 may send an indication (e.g., a stopping indication) to the network (e.g., the network device 404) that indicates that the WTRU 402 has stopped using the network device 404 as a positioning delegate. The WTRU 402 may then re-start performing its own location determination and/or measurements.

Figure 5:
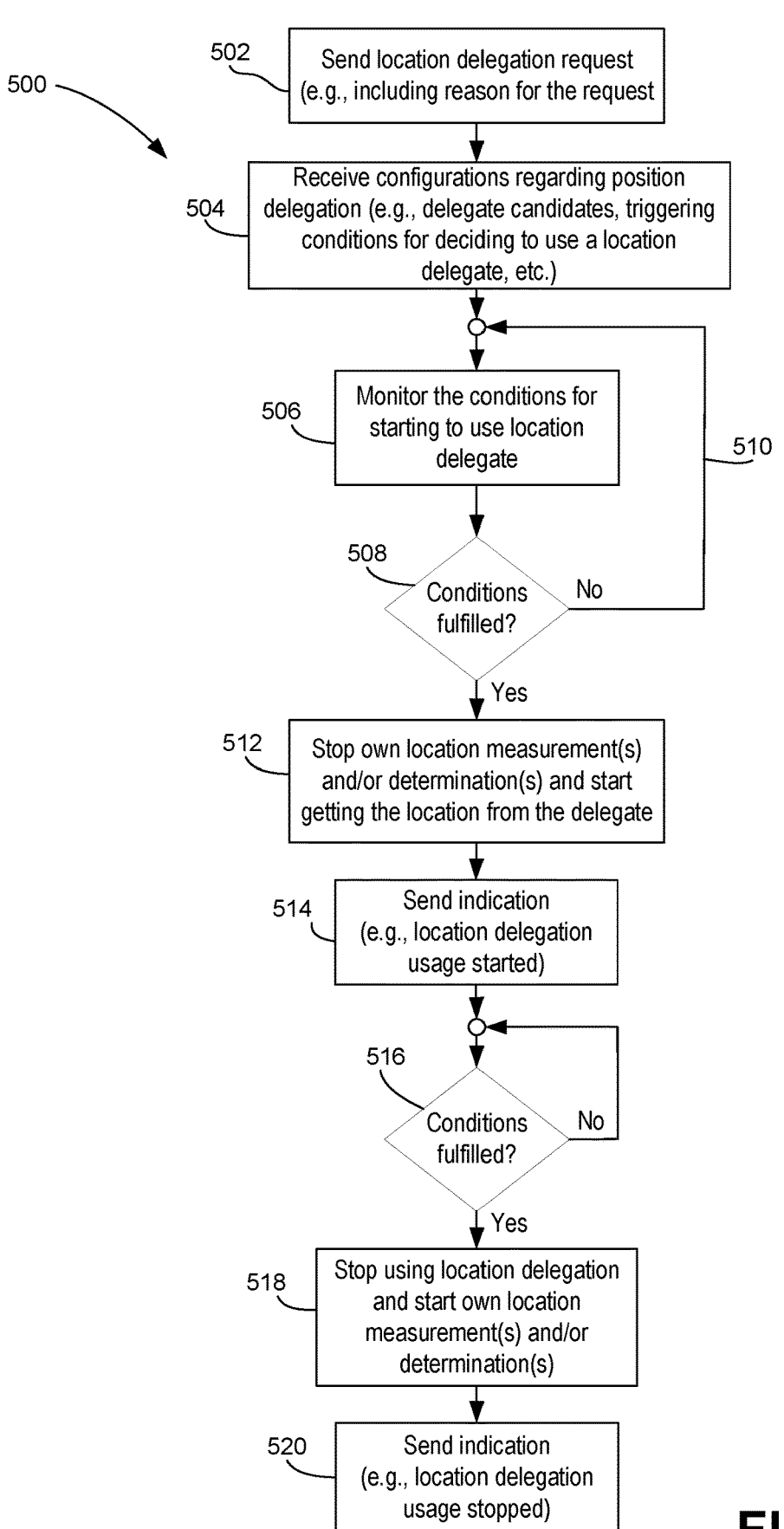
FIG. 5 depicts a flowchart describing an example procedure a WTRU follows to obtain configurations related to positioning delegation.

FIG. 5 depicts a flowchart of an example procedure 500 performed by a WTRU (e.g., the WTRU 302 and/or the WTRU 402). The WTRU may perform the procedure 500 to obtain configurations related to positioning delegation, e.g., send location delegation request, monitor conditions for using a positioning delegate, and/or sending indications to the network that the WTRU has started and/or stopped performing positioning measurements and determinations.

At 502, the WTRU may send a location delegation request to a network device (e.g., an IAB node). The WTRU may send a message to the network device (e.g., an IAB node) requesting to perform positioning delegation The location delegation request may include a reason for the request. At 504, the WTRU may receive configurations regarding position delegation. The configurations may include delegate positioning candidate information, and/or triggering conditions for deciding to use a positioning candidate, etc. At 506, the WTRU may monitor the conditions for starting to use the location delegate.

At 508, the WTRU will determine whether the conditions for starting to use the location delegate are satisfied. If the WTRU determines the conditions for starting the use of the location delegate are not met, the WTRU may continue to monitor the conditions for starting the use of the location delegate at 510. If the WTRU determines the conditions for starting to use the location delegate are satisfied, the WTRU may stop performing the location measurements and/or determinations at 512. If the WTRU determines the conditions for starting to use the location delegate are satisfied, the WTRU may start getting the location information from the positioning delegate candidate at 512.

The WTRU may perform measurements related to positioning reference signal (PRS) transmissions. The WTRU may report PRS measurements based on detecting that the condition for disabling positioning delegation has been satisfied for the delegation candidate. The WTRU may perform positioning measurements for a specified duration after connecting to the positioning delegate and compare the location information that it has determined with the location information provided by the positioning delegate.

At 514, the WTRU has selected a location delegate and may send an indication (e.g., a starting indication) to the network device (e.g., an IAB node) that location delegation has started and/or remains ongoing. The WTRU may send an indication to a network device (e.g., an IAB node) that the WTRU is using the at least one positioning delegation candidate for positioning based on detecting that the condition for enabling positioning delegation (e.g., starting positioning delegation) has been satisfied for the at least one positioning delegation candidate. The indication may include location information that indicates the position of the positioning delegation candidate. In examples, the WTRU may receive a positioning request from a network device (e.g., an IAB node), and the WTRU may then send the indication is to the network device (e.g., an IAB node) in response to the positioning request.

A condition for enabling the positioning delegation (e.g., starting positioning delegation) may include, e.g., a WTRU battery level falling below a threshold, a WTRU connecting to the at least one positioning delegation candidate, and/or a WTRU detecting that the WTRU is within a specified proximity to the at least one positioning delegation candidate. The condition for enabling the positioning delegation may include the WTRU detecting that the WTRU is within the specified proximity to the at least one positioning delegation candidate based on a signal strength measurement received from a positioning delegation candidate.

The WTRU may send a location disparity report to the network device, wherein location disparity report indicates a difference between the location of the WTRU and a location of the positioning delegate.

At 516, the WTRU will determine whether the conditions for stopping the use of the location delegate are satisfied. If the WTRU determines the conditions for stopping to use the location delegate are not met, the WTRU may continue to monitor the conditions for stopping to use location delegation and determine whether the conditions for stopping to use the location delegate are met 516. In some examples, the WTRU may send more than one indication (e.g., a stopping indication) that indicates that location delegation remains ongoing upon a determination that the conditions for stopping the use of location delegation are not satisfied. If the WTRU determines the conditions for stopping the use of the location delegate are satisfied, the WTRU may stop using location delegation (e.g., disable location delegation) and start performing its own location measurements and/or determinations at 518.

At 520, the WTRU may send an indication (e.g., a stopping indication) to the network device (e.g., an IAB node) that location delegation has stopped (e.g., has been disabled) and/or that the WTRU is performing its own location measurements and/or determinations. The WTRU may send the indication to the network device that the WTRU has stopped using the at least one positioning delegation candidate for positioning based on detecting that the condition for disabling positioning delegation has been satisfied for the at least one positioning delegation candidate.

In some examples, the WTRU may perform 502 through 514 (e.g., only 502 through 514), and may not perform 516 through 522. For example, the WTRU may perform only 502 through 514, for instance, if the WTRU is disconnected from the network.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well. For example, while the system has been described with reference to a 3GPP, 5G, and/or NR network layer, the envisioned embodiments extend beyond implementations using a particular network layer technology. Likewise, the potential implementations extend to all types of service layer architectures, systems, and embodiments. The techniques described herein may be applied independently and/or used in combination with other resource configuration techniques.

The processes described herein may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read-only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

It is understood that the entities performing the processes described herein may be logical entities that may be implemented in the form of software (e.g., computer-executable instructions) stored in a memory of, and executing on a processor of, a mobile device, network node or computer system. That is, the processes may be implemented in the form of software (e.g., computer-executable instructions) stored in a memory of a mobile device and/or network node, such as the node or computer system, which computer-executable instructions, when executed by a processor of the node, perform the processes discussed. It is also understood that any transmitting and receiving processes illustrated in figures may be performed by communication circuitry of the node under control of the processor of the node and the computer-executable instructions (e.g., software) that it executes.

The various techniques described herein may be implemented in connection with hardware or software or, where appropriate, with a combination of both. Thus, the implementations and apparatus of the subject matter described herein, or certain aspects or portions thereof, may take the form of program code (e.g., instructions) embodied in tangible media including any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable devices, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object-oriented programming language to communicate with a computer system. However, the program(s) can be implemented in assembly or machine language, if desired. In any case, the language may be a compiled or interpreted language and combined with hardware implementations.

Although example embodiments may refer to utilizing aspects of the subject matter described herein in the context of one or more stand-alone computing systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

In describing the preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

What is claimed is:

1. A wireless transmit/receive unit (WTRU) comprising:
   a processor and memory, wherein the processor and memory are configured to:
   receive positioning configuration information, the positioning configuration information comprising an indication of one or more positioning delegation candidates for the WTRU and an indication of one or more conditions for starting or stopping to use a positioning delegation;
   detect that a condition for starting to use the positioning delegation has been satisfied for at least one of the positioning delegation candidates;
   send a starting indication to a network that the WTRU is using the at least one positioning delegation candidate for positioning based on a detection that the condition for starting to use a positioning delegation has been satisfied for the at least one positioning delegation candidate;

detect that a condition for stopping to use the positioning delegation has been satisfied for the at least one positioning delegation candidate; and send a stopping indication to the network that the WTRU has stopped using the at least one positioning delegation candidate for positioning based on detecting that the condition for stopping the positioning delegation has been satisfied for the at least one positioning delegation candidate.

2. The WTRU of claim 1, wherein the processor and memory are configured to:

send a message to the network requesting to perform positioning delegation.

3. The WTRU of claim 2, wherein the condition for starting to use the positioning delegation comprises detecting that the WTRU is within the specified proximity to the at least one positioning delegation candidate based on a signal strength measurement received from the at least one positioning delegation candidate.

4. The WTRU of claim 1, wherein the condition for starting to use the positioning delegation comprises one or more of a WTRU battery level falling below a threshold, connecting to the at least one positioning delegation candidate, or detecting that the WTRU is within a specified proximity to the at least one positioning delegation candidate.

5. The WTRU of claim 1, wherein the processor and memory are configured to: perform measurements of one or more positioning reference signal (PRS) transmissions and reporting PRS measurements based on detecting that the condition for stopping to use the positioning delegation has been satisfied for the at least one positioning delegation candidate.

6. The WTRU of claim 1, wherein the starting indication comprises location information that indicates the position of the at least one positioning delegation candidate.

7. The WTRU of claim 6, wherein the processor and memory are configured to:

receive a positioning request from a network, wherein the starting indication is sent to the network in response to the positioning request.

8. The WTRU of claim 1, wherein the processor and memory are configured to:

send a location disparity report to the network, wherein location disparity report indicates a difference between the location of the WTRU and a location of the positioning delegate.

9. The WTRU of claim 8, wherein the processor and memory are configured to send the location disparity report to the network based on the difference exceeding a disparity threshold for a predetermined period of time.

10. The WTRU of claim 1, wherein the processor and memory are configured to:

perform positioning measurements for a specified duration after connecting to the positioning delegate and compare the location information that it has determined with the location information provided by the positioning delegate.

11. A method performed by a wireless transmit/receive unit (WTRU) comprising:

receiving positioning configuration information, the positioning configuration information comprising an indication of one or more positioning delegation candidates for the WTRU, an indication of one or more conditions for starting or stopping to use a positioning delegation;

detecting that a condition for starting to use the positioning delegation has been satisfied for at least one of the positioning delegation candidates;

sending a starting indication to a network that the WTRU is using the at least one positioning delegation candidate for positioning based on detecting that the condition for starting to use a positioning delegation has been satisfied for the at least one positioning delegation candidate;

detecting that a condition for stopping to use the positioning delegation has been satisfied for the at least one positioning delegation candidate; and sending a stopping indication to the network that the WTRU has stopped using the at least one positioning delegation candidate for positioning based on detecting that the condition for stopping to use the positioning delegation has been satisfied for the at least one positioning delegation candidate.

12. The method of claim 11, further comprising:

sending a message to the network requesting to perform positioning delegation.

13. The method of claim 11, wherein the condition for starting to use the positioning delegation comprises one or more of a WTRU battery level falling below a threshold, connecting to the at least one positioning delegation candidate, or detecting that the WTRU is within a specified proximity to the at least one positioning delegation candidate.

14. The method of claim 13, wherein the condition for starting to use the positioning delegation comprises detecting that the WTRU is within the specified proximity to the at least one positioning delegation candidate based on a signal strength measurement received from the at least one positioning delegation candidate.

15. The method of claim 11, further comprising:

performing measurements of one or more positioning reference signal (PRS) transmissions and reporting PRS measurements based on detecting that the condition for stopping positioning delegation has been satisfied for the at least one positioning delegation candidate.

16. The method of claim 11, wherein the indication comprises location information that indicates the position of the at least one positioning delegation candidate.

17. The method of claim 16, further comprising:

receiving a positioning request from a network, wherein the indication is sent to the network in response to the positioning request.

18. The method of claim 11, further comprising:

sending a location disparity report to the network based on the difference exceeding a disparity threshold for a predetermined period of time.

19. A wireless transmit/receive unit (WTRU) comprising:

a processor and memory, wherein the processor and memory are configured to:

receive positioning configuration information;

select a positioning delegation candidate for positioning based on the positioning configuration information;

send a starting indication to a network that the WTRU is using the positioning delegation candidate for positioning; and send a stopping indication to the network that the WTRU has stopped using the positioning delegation candidate for positioning.

20. The WTRU of claim 19, wherein the positioning configuration information comprises an indication of one or more positioning delegation candidates for the WTRU and an indication of one or more conditions for starting or stopping positioning delegation, wherein the one or more positioning delegation candidates indicated by the positioning configuration information comprises the selected positioning delegation candidate; and wherein the processor and memory are configured to:

detect that a condition for starting positioning delegation has been satisfied for the selected positioning delegation candidates;

send the starting indication to the network that the WTRU is using the selected positioning delegation candidate for positioning based on detecting that the condition for starting positioning delegation has been satisfied for the selected positioning delegation candidate;

detect that a condition for stopping positioning delegation has been satisfied for the selected positioning delegation candidate; and send the stopping indication to the network that the WTRU has stopped using the selected positioning delegation candidate for positioning based on detecting that the condition for stopping to use the positioning delegation has been satisfied for the selected positioning delegation candidate.

* * * * *